US 8,985,249 B2

(12) United States Patent
Shirokura et al.

(10) Patent No.: US 8,985,249 B2
(45) Date of Patent: Mar. 24, 2015

(54) INVERTED PENDULUM TYPE VEHICLE

(71) Applicant: Honda Motor Co., Ltd., Minato-Ku, Tokyo (JP)

(72) Inventors: Shinya Shirokura, Saitama (JP); Hideo Murakami, Saitama (JP); Toru Takenaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 174 days.

(21) Appl. No.: 13/677,827

(22) Filed: Nov. 15, 2012

(65) Prior Publication Data
US 2013/0133968 A1    May 30, 2013

(30) Foreign Application Priority Data

Nov. 26, 2011  (JP) .................................. 2011-258365
May 14, 2012   (JP) .................................. 2012-111032

(51) Int. Cl.
*B62D 57/00* (2006.01)
*B62D 61/02* (2006.01)
*B62K 17/00* (2006.01)
*B60B 19/00* (2006.01)
*B62K 1/00* (2006.01)

(52) U.S. Cl.
CPC .............. *B62D 61/02* (2013.01); *B60B 19/003* (2013.01); *B62D 57/00* (2013.01); *B62K 1/00* (2013.01); *B62K 17/00* (2013.01)
USPC .................................. 180/7.1; 180/10; 180/20

(58) Field of Classification Search
USPC ............................. 180/6.2, 7.1, 10, 11, 20, 21
See application file for complete search history.

(56) References Cited

U.S. PATENT DOCUMENTS

| 3,376,945 | A | * | 4/1968 | Kaprelian et al. | ........... 180/6.48 |
| 3,396,690 | A | * | 8/1968 | Tsunazawa | ................ 440/12.65 |
| 3,420,326 | A | * | 1/1969 | Kusmer | .......................... 180/6.2 |
| 4,223,753 | A | * | 9/1980 | Bradbury | ........................ 180/6.2 |
| 4,237,990 | A | * | 12/1980 | La | .................................. 180/7.1 |

(Continued)

FOREIGN PATENT DOCUMENTS

EP         2 138 379 A1    12/2009
JP       2011-068165 A      4/2011

(Continued)

OTHER PUBLICATIONS

Korean Office Action issued in the counterpart Korean patent application 10-2012-0123546 and dated Jan. 23, 2014.

*Primary Examiner* — Anne Marie Boehler
*Assistant Examiner* — Maurice Williams
(74) *Attorney, Agent, or Firm* — Carrier Blackman & Associates, P.C.; Joseph P. Carrier; William D. Blackman

(57) ABSTRACT

An inverted pendulum type vehicle having a tiltable rider mounting section includes a first travel operation unit and a second travel operation unit, which are disposed with an interval provided therebetween in the longitudinal direction and which are capable of traveling in all directions, and an operation device which outputs a turn command. In the case where the turn command is output from the operation device in a situation wherein at least the first travel operation unit is traveling in the longitudinal direction or at rest, the moving velocity of the ground contact point of the first travel operation unit and the moving velocity of the ground contact point of the second travel operation unit in the lateral direction of a rider are controlled to have velocities that are different from each other.

8 Claims, 8 Drawing Sheets

(56) References Cited

U.S. PATENT DOCUMENTS

| | | | |
|---|---|---|---|
| 4,353,428 A * | 10/1982 | Kovar et al. | 180/7.1 |
| 4,715,460 A * | 12/1987 | Smith | 180/7.1 |
| 5,213,176 A * | 5/1993 | Oroku et al. | 180/168 |
| 6,547,339 B2 * | 4/2003 | Bandou et al. | 301/5.23 |
| 7,730,978 B2 * | 6/2010 | Dixon | 180/7.1 |
| 7,747,349 B2 * | 6/2010 | Yeh et al. | 700/245 |
| 7,949,437 B2 * | 5/2011 | Wong et al. | 701/1 |
| 8,025,551 B2 * | 9/2011 | Torres et al. | 446/431 |
| 8,240,409 B2 * | 8/2012 | Grosjean | 180/21 |
| 8,342,270 B2 | 1/2013 | Takenaka et al. | |
| 8,459,383 B1 * | 6/2013 | Burget | 180/7.1 |
| 8,556,279 B2 * | 10/2013 | McKinnon | 280/47.27 |
| 8,583,302 B2 | 11/2013 | Akimoto et al. | |
| 2002/0112899 A1 * | 8/2002 | Dijksman et al. | 180/7.1 |
| 2004/0182614 A1 * | 9/2004 | Wakui | 180/7.1 |
| 2008/0156547 A1 * | 7/2008 | Dixon | 180/7.1 |
| 2011/0209932 A1 | 9/2011 | Takenaka et al. | |

FOREIGN PATENT DOCUMENTS

| | | |
|---|---|---|
| JP | 2011-068218 A | 4/2011 |
| TW | 201024114 A | 7/2010 |

* cited by examiner

INVERTED PENDULUM TYPE VEHICLE

BACKGROUND OF THE INVENTION

1. Field of the Invention

The present invention relates to an inverted pendulum type vehicle capable of traveling on a floor surface.

2. Description of the Related Art

There has conventionally been known an inverted pendulum type vehicle in which a rider mounting section tiltable relative to the vertical direction is attached to a base body, to which a travel operation unit that travels on a floor surface and an actuator that drives the travel operation unit are installed. The inverted pendulum type vehicle is configured to control the traveling motion of the travel operation unit by moving the supporting point of an inverted pendulum so as to independently stabilize the rider mounting section with a rider sitting thereon.

In, for example, Japanese Patent Application Laid-Open No. 2011-068165 (hereinafter referred to as Patent Document 1), an inverted pendulum type vehicle in which a travel operation unit is driven according to the tilt or the like of a rider mounting section thereby to permit travel on a floor surface in all directions, including the longitudinal direction and the lateral direction relative to a rider, has been proposed by the applicant of the present application.

The conventional inverted pendulum type vehicle disclosed in Patent Document 1 enables the rider to turn the vehicle by moving his/her upper body so as to gradually change the traveling direction of the vehicle. Generally, however, the rider is required to have a high steering skill to accomplish a smooth turn.

Especially when the vehicle is traveling forward at a low velocity or when the vehicle has almost come to a stop, turning the vehicle, i.e., changing the direction thereof, has been difficult for even a skilled rider.

SUMMARY OF THE INVENTION

The present invention has been made with a view to the background described above, and an object thereof is to provide an inverted pendulum type vehicle with enhanced maneuverability of the vehicle capable of permitting an easy turn of the vehicle.

To this end, an inverted pendulum type vehicle in accordance with the present invention has at least: a first travel operation unit capable of traveling on a floor surface; a first actuator that drives the first travel operation unit; a base body to which the first travel operation unit and the first actuator are installed; and a rider mounting section attached to the base body such that the rider mounting section is tiltable relative to a vertical direction, wherein the first travel operation unit is configured to be capable of traveling in all directions, including a longitudinal direction and a lateral direction relative to a rider on the rider mounting section, by a driving force of the first actuator, the inverted pendulum type vehicle further including:

a second travel operation unit, which is connected to the first travel operation unit or the base body with an interval provided from the first travel operation unit in the longitudinal direction and which is configured to be capable of traveling in all directions on a floor surface;

a second actuator which generates a driving force for causing at least the second travel operation unit to travel in the lateral direction;

an operation device which outputs a turn command for at least causing the inverted pendulum type vehicle to turn in response to an operation performed by the rider on the rider mounting section;

a first control unit which controls a traveling motion of the first travel operation unit by controlling the first actuator; and a second control unit which controls a traveling motion of the second travel operation unit by controlling the second actuator, wherein the first control unit controls the first actuator to cause the first travel operation unit to travel on the basis of at least the tilting of the rider mounting section in one or both of the longitudinal direction and the lateral direction in both a case where the turn command has been output from the operation device and a case where the turn command has not been output therefrom, and the second control unit controls the second actuator such that the moving velocity of a ground contact point of the second travel operation unit in the lateral direction is different from the moving velocity of a ground contact point of the first travel operation unit in the lateral direction in a case where the turn command has been issued from the operation device in a situation in which at least the first travel operation unit is traveling in the longitudinal direction or at rest (a first aspect of the invention).

According to the first aspect of the invention, the inverted pendulum type vehicle is provided with, in addition to the first travel operation unit and the first actuator, the operation device that outputs the turn command, the second travel operation unit, which is disposed with the interval provided in the longitudinal direction relative to the first travel operation unit and which is capable of traveling in all directions, and a second actuator, which generates the driving force for causing the second travel operation unit to travel in the lateral direction.

Further, in both the case where the turn command has been output from the operation device and the case where the turn command has not been output therefrom, the first actuator is controlled by the first control unit to cause the first travel operation unit to travel on the basis of at least the tilting of the rider mounting section in one or both of the longitudinal direction and the lateral direction.

Meanwhile, the second control unit controls the second actuator such that the moving velocity of the ground contact point of the second travel operation unit in the lateral direction is different from the moving velocity of the ground contact point of the first travel operation unit in the lateral direction in the case where the turn command has been issued from the operation device in the situation in which at least the first travel operation unit is traveling in the longitudinal direction or at rest.

Hence, the first travel operation unit and the second travel operation unit develop a difference in the moving velocities of their ground contact points in the lateral direction. This allows the inverted pendulum type vehicle to accomplish a turn, including the change of direction, independently of the traveling velocity of the inverted pendulum type vehicle in the longitudinal direction.

Thus, the inverted pendulum type vehicle according to the first aspect of the invention enables a rider on the rider mounting section to cause the vehicle to travel by tilting the rider mounting section and also to cause the vehicle to turn by operating the operation device to output the turn command, obviating the need for a complicated tilting motion of the rider mounting section.

Hence, the inverted pendulum type vehicle according to the first aspect of the invention enhances the maneuverability of the vehicle, thus permitting easier turns of the vehicle.

In the first aspect of the invention, the second travel operation unit is disposed, for example, at the rear of the first travel operation unit. In this case, the second control unit controls the second actuator such that a relative traveling velocity of the ground contact point of the second travel operation unit in the lateral direction with respect to the ground contact point of the first travel operation unit becomes a leftward relative velocity in the case where the turn command for turning the inverted pendulum type vehicle to the right has been output from the operation device, or such that a relative traveling velocity of the ground contact point of the second travel operation unit in the lateral direction with respect to the ground contact point of the first travel operation unit becomes a rightward relative velocity in the case where the turn command for turning the inverted pendulum type vehicle to the left has been output from the operation device (a second aspect of the invention).

According to the second aspect of the invention, the direction of the relative traveling velocity of the ground contact point of the second travel operation unit in the lateral direction with respect to the ground contact point of the first travel operation unit will be a direction that corresponds to the turning direction of the vehicle specified by the turn command. This allows the vehicle to smoothly turn to the right or the left.

In the first aspect or the second aspect of the invention described above, the vehicle can be turned in a state wherein the first travel operation unit is not traveling. In this case, however, the turn of the vehicle may not be smoothly made due to a frictional force between the first travel operation unit and a floor surface.

Therefore, in the first aspect and the second aspect of the invention, the first control unit preferably controls the first actuator to cause the first travel operation unit to travel in the lateral direction in the case where the turn command has been output from the operation device in a situation in which at least the moving velocity of the ground contact point of the first travel operation unit in the lateral direction is zero (a third aspect of the invention).

In the third aspect of the invention, the situation in which the moving velocity of the ground contact point of the first travel operation unit in the lateral direction is zero does not mean only a situation in which the moving velocity is precisely zero but includes a situation in which the magnitude of the moving velocity is sufficiently small (substantially zero).

According to the third aspect of the invention, the vehicle is turned while the first travel operation unit is traveling in the lateral direction. This reduces the frictional force between the first travel operation unit and the floor surface. As a result, a smooth turn of the vehicle can be achieved.

In the second aspect of the invention, preferably, the first control unit controls the first actuator to cause the first travel operation unit to travel leftwards in the case where the turn command for turning the inverted pendulum type vehicle to the right has been output from the operation device in a first situation in which at least the moving velocity of the ground contact point of the first travel operation unit in the longitudinal direction and the lateral direction has reached zero, or controls the first actuator to cause the first travel operation unit to travel rightwards in the case where the turn command for turning the inverted pendulum type vehicle to the left has been output from the operation device in the first situation (a fourth aspect of the invention).

In the fourth aspect of the invention, the situation (the first situation), in which the moving velocity of the ground contact point of the first travel operation unit in the longitudinal direction and the lateral direction is zero does not mean only a situation in which the moving velocity in the longitudinal direction and the lateral direction is precisely zero but includes a situation in which the magnitude of the moving velocity in the longitudinal direction or the lateral direction is sufficiently small (substantially zero).

According to the fourth aspect of the invention, the first travel operation unit is controlled to travel leftwards of the lateral direction in the case where the turn command for causing the inverted pendulum type vehicle to turn to the right is output from the operation device in the first situation.

Further, the first travel operation unit is controlled to travel rightwards of the lateral direction in the case where the turn command for causing the inverted pendulum type vehicle to turn to the left is output from the operation device in the first situation.

Further, the second travel operation unit is controlled to travel at a traveling velocity that is higher than that of the first travel operation unit and in the same direction of the lateral direction as that of the first travel operation unit.

Therefore, the turn of the vehicle according to the turn command in the first situation will be made such that the instantaneous turn centers exist in front regions of the ground contact surfaces of the first and the second travel operation units. The instantaneous center of the turn in the present description means the center of rotation of the rotational motion of the vehicle in the direction about a yaw axis at each instant while the vehicle is turning.

As a result, the rider on the rider mounting section easily senses the turning behavior of the vehicle. This enables the rider to operate the operation device to obtain a desired turning behavior by properly recognizing the turning behavior of the vehicle.

Further, the turn of the vehicle is made while both the first travel operation unit and the second travel operation unit are traveling in the lateral direction, thus protecting the turn from being interfered with by the frictional force between each of the travel operation units and a floor surface. This allows the turn to be smoothly accomplished.

In the fourth aspect of the invention described above, the first control unit and the second control unit preferably control the first actuator and the second actuator, respectively, such that the moving velocity of the ground contact point of the first travel operation unit in the lateral direction becomes a moving velocity of zero or more in the same direction as the moving velocity of the ground contact point of the second travel operation unit and such that the magnitude of the moving velocity of the ground contact point of the second travel operation unit in the lateral direction is larger than the magnitude of the moving velocity of the ground contact point of the first travel operation unit in the case where the turn command is output from the operation device in a second situation, in which at least the first travel operation unit is traveling in the longitudinal direction (a fifth aspect of the invention).

According to the fifth aspect of the invention, the moving velocities of the ground contact points of the first travel operation unit and the second travel operation unit are controlled as described above in the case where the turn command is output from the operation device in the second situation in which the first travel operation unit is traveling in the longitudinal direction, that is, in a situation in which the vehicle is traveling in the longitudinal direction. This causes the vehicle to turn such that the instantaneous turn center exists in the ground contact surface of the first travel operation unit or in a region ahead of the ground contact surface.

This arrangement enables the rider on the rider mounting section to operate the operation device to obtain a desired turning behavior while easily sensing the turning behavior of the vehicle.

In the fifth aspect of the invention described above, the first control unit and the second control unit are also capable of controlling the first actuator and the second actuator, respectively, so as to maintain the ratio of the magnitude of the moving velocity of the ground contact point of the first travel operation unit with respect to the magnitude of the moving velocity of the ground contact point of the second travel operation unit in the lateral direction at a predetermined value in the case where the turn command is output from the operation device in the second situation.

However, the first control unit and the second control unit preferably control the first actuator and the second actuator, respectively, so as to bring the ratio of the magnitude of the moving velocity of the ground contact point of the first travel operation unit relative to the magnitude of the moving velocity of the ground contact point of the second travel operation unit in the lateral direction closer to zero as the magnitude of the moving velocity in the longitudinal direction of a preset representative point of the inverted pendulum type vehicle increases in the case where the turn command is output from the operation device in the second situation (a sixth aspect of the invention).

The representative point of the inverted pendulum type vehicle may be, for example, the point of gravity center of the entire vehicle, the point of a position fixed relative to the base body or the rider mounting section, or a point having the same moving velocity in the longitudinal direction as the traveling velocity of the first travel operation unit.

According to the sixth aspect of the invention, when turning the vehicle in response to the turn command, the aforesaid ratio approaches zero as the moving velocity of the representative point of the inverted pendulum type vehicle in the longitudinal direction increases. Therefore, the travel of the first travel operation unit and the second travel operation unit in the lateral direction decreases, making it easy for the turning path of the vehicle to follow a desired path. This permits easier control of the operation device to accomplish a desired turn while moving the vehicle in the longitudinal direction.

When the vehicle is turned according to the turn command in the case where the moving velocity of the representative point of the inverted pendulum type vehicle in the longitudinal direction is low, the turn of the vehicle is made by moving the first travel operation unit and the second travel operation unit in the lateral direction. This makes it possible to prevent the turn of the vehicle from being interfered with by the frictional force between the travel operation units and the floor surface in a situation in which the moving velocity of the representative point of the inverted pendulum type vehicle in the longitudinal direction is low. As a result, the turn can be smoothly made.

In the inverted pendulum type vehicle according to the present invention, the second travel operation unit is disposed, for example, at the rear side of the first travel operation unit in the first aspect of the invention described above. In this case, the first control unit and the second control unit preferably control the moving velocities of the ground contact points of the first travel operation unit and the second travel operation unit in the lateral direction through the first actuator and the second actuator, respectively, such that the inverted pendulum type vehicle turns and the instantaneous turn center lies in a front region of the ground contact surface of the first travel operation unit in the case where the turn command has been output from the operation device in the first situation, in which at least the moving velocity of the ground contact point of the first travel operation unit in the longitudinal direction and the lateral direction is zero (a seventh aspect of the invention).

In the seventh aspect, as with the case of the fourth aspect of the invention, the situation (the first situation), in which the moving velocity of the ground contact point of the first travel operation unit in the longitudinal direction and the lateral direction is zero does not mean only a situation in which the moving velocity in the longitudinal direction and the lateral direction is precisely zero but includes a situation in which the magnitude of the moving velocity in the longitudinal direction or the lateral direction is sufficiently minute (substantially zero).

According to the seventh aspect of the invention, as with the case of the fourth aspect of the invention, the turn of the vehicle according to the turn command in the first situation will be made such that the instantaneous turn centers lie in front regions of the ground contact surfaces of the first and the second travel operation units.

As a result, the rider on the rider mounting section easily senses the turning behavior of the vehicle. This enables the rider to operate the operation device to obtain a desired turning behavior by properly recognizing the turning behavior of the vehicle.

Further, both the first travel operation unit and the second travel operation unit travel in the lateral direction when the vehicle turns, thus preventing the turn from being interfered with by the frictional force between each of the travel operation units and a floor surface. This allows the turn to be smoothly accomplished.

In the seventh aspect of the invention, the vehicle can be turned such that the instantaneous turn center lies in a front region of the first travel operation unit by controlling the moving velocities of the ground contact points of the first travel operation unit and the second travel operation unit in the lateral direction in the same manner as that of the fourth aspect of the invention described above.

Further, in the seventh aspect of the invention, the first control unit and the second control unit preferably control the moving velocities of the ground contact points of the first travel operation unit and the second travel operation unit in the lateral direction through the first actuator and the second actuator, respectively, such that the inverted pendulum type vehicle turns and the instantaneous center of the turn lies in the ground contact surface of the first travel operation unit or in a region ahead of the ground contact surface in the case where the turn command has been output from the operation device in a second situation in which at least the first travel operation unit is traveling in the longitudinal direction (an eighth aspect of the invention).

According to the eighth aspect of the invention, the vehicle will turn such that the instantaneous turn center exists in the ground contact surface of the first travel operation unit or in a region ahead of the ground contact surface, as with the fifth aspect of the invention, in the case where the turn command is output from the operation device in the second situation in which the first travel operation unit is traveling in the longitudinal direction, that is, in a situation in which the vehicle is traveling in the longitudinal direction.

This arrangement enables the rider on the rider mounting section to operate the operation device to obtain a desired turning behavior while easily sensing the turning behavior of the vehicle.

In the eighth aspect of the invention, the vehicle can be turned such that the instantaneous turn center exists in the ground contact surface of the first travel operation unit or a region ahead of the ground contact surface thereof by controlling the moving velocities of the ground contact points of the first travel operation unit and the second travel operation unit in the lateral direction in the same manner as that in the fifth aspect of the invention.

In the eighth aspect of the invention, the first control unit and the second control unit are capable of setting the instantaneous center of the turn at a position fixed relative to the vehicle in the case where the turn command has been output from the operation device in the second situation.

However, the first control unit and the second control unit preferably control the moving velocities of the ground contact points of the first travel operation unit and the second travel operation unit in the lateral direction through the first actuator and the second actuator, respectively, so as to bring the instantaneous center of the turn closer to the ground contact surface of the first travel operation unit from the front side of the ground contact surface as the magnitude of the moving velocity in the longitudinal direction of a preset representative point of the inverted pendulum type vehicle increases in the case where the turn command has been output from the operation device in the second situation (a ninth aspect of the invention).

As with the sixth aspect of the invention, the representative point of the inverted pendulum type vehicle may be, for example, the point of gravity center of the entire vehicle, the point of a position fixed relative to the base body or the rider mounting section, or a point having the same moving velocity in the longitudinal direction as the traveling velocity of the first travel operation unit.

According to the ninth aspect of the invention, when turning the vehicle in response to the turn command, the travel of the first travel operation unit and the second travel operation unit in the lateral direction decreases as the magnitude of the moving velocity of the representative point of the inverted pendulum type vehicle in the longitudinal direction increases, making it easy for the turning path of the vehicle to follow a desired path, as with the sixth aspect of the invention. This permits easier control of the operation device to accomplish a desired turn while moving the vehicle in the longitudinal direction.

When the vehicle is turned according to the turn command in the case where the moving velocity of the representative point of the inverted pendulum type vehicle in the longitudinal direction is low, the turn of the vehicle is made by moving the first travel operation unit and the second travel operation unit in the lateral direction, as with the case of the sixth aspect of the invention. This makes it possible to prevent the turn of the vehicle from being interfered with by the frictional force between the travel operation units and the floor surface in a situation in which the moving velocity of the representative point of the inverted pendulum type vehicle in the longitudinal direction is low. As a result, the turn can be smoothly made.

In the ninth aspect of the invention, the instantaneous center of the turn can be brought closer to the ground contact surface of the first travel operation unit from the front side of the ground contact surface as the magnitude of the moving velocity of the representative point of the inverted pendulum type vehicle in the longitudinal direction increases by controlling the moving velocities of the ground contact points of the first travel operation unit and the second travel operation unit in the same manner as that of the sixth aspect of the invention in the case where the turn command has been issued from the operation device in the second situation.

Supplementarily, the inverted pendulum type vehicle in accordance with the present invention may be configured as follows. If, for example, the rider mounting section can be tilted together with the base body, then the second travel operation unit is disposed at the rear of the first travel operation unit, and the second travel operation unit is provided such that the second travel operation unit swings about the axis in the lateral direction relative to the base body. In this case, a mechanism that restricts the swinging range of the second travel operation unit relative to the base body is provided in the vehicle.

This arrangement makes it possible to prevent the rider mounting section from excessively tilting toward the rear.

An urging member, such as a spring, that presses the second travel operation unit against a floor surface may be provided. This makes it possible to prevent the second travel operation unit from slipping.

The operation device may be further provided with a function for issuing a go-forward/backward command for causing the inverted pendulum type vehicle to move forward or backward in response to an operation by a rider on the rider mounting section. In this case, the first control unit may be configured to control the first actuator so as to move the first travel operation unit in the longitudinal direction when the go-forward/backward command has been issued from the operation device.

DESCRIPTION OF THE PREFERRED EMBODIMENTS

[First Embodiment]

Figure 1:
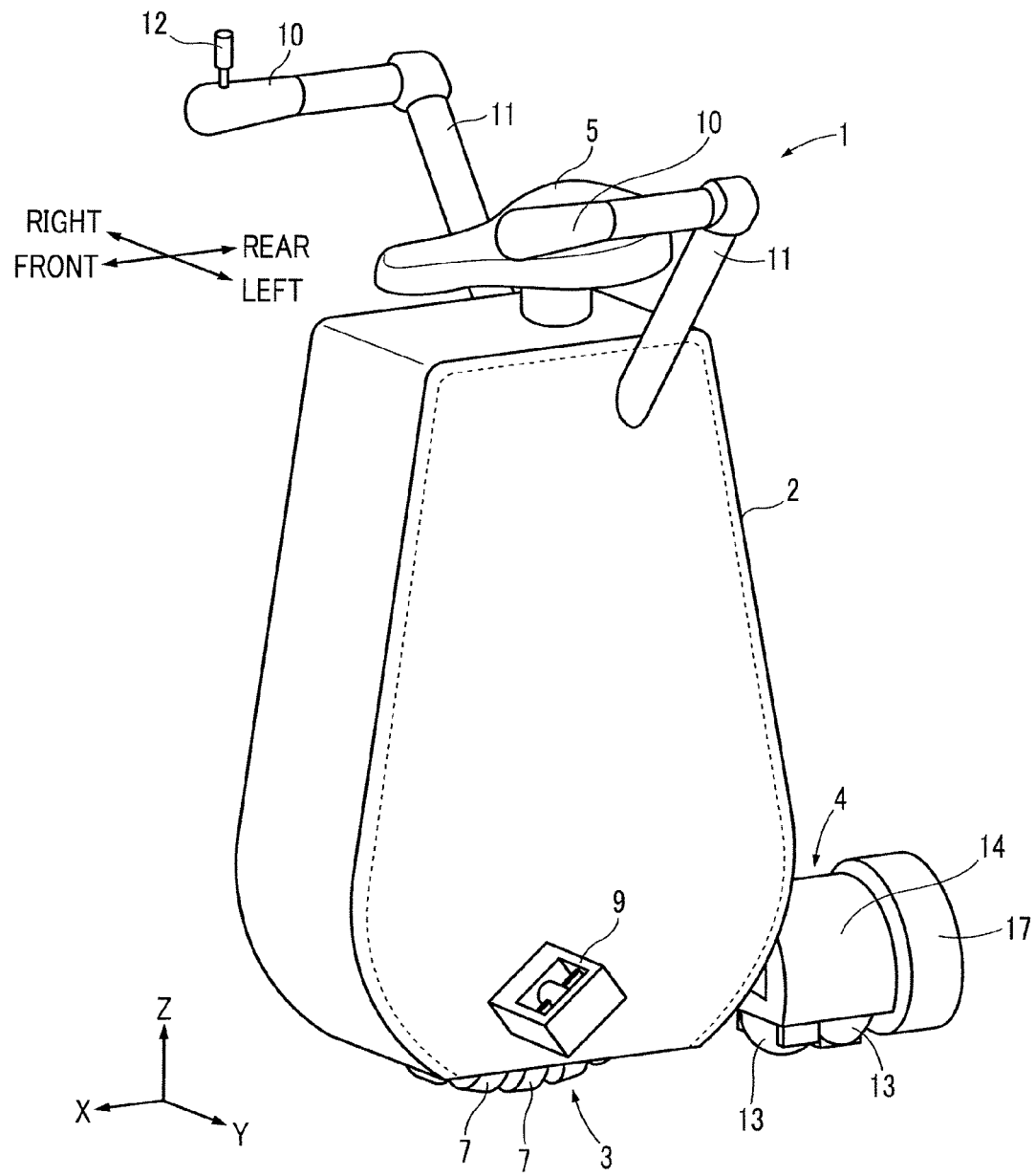
FIG. 1 is a perspective view illustrating the appearance of an inverted pendulum type vehicle according to a first embodiment of the present invention.
Figure 2:
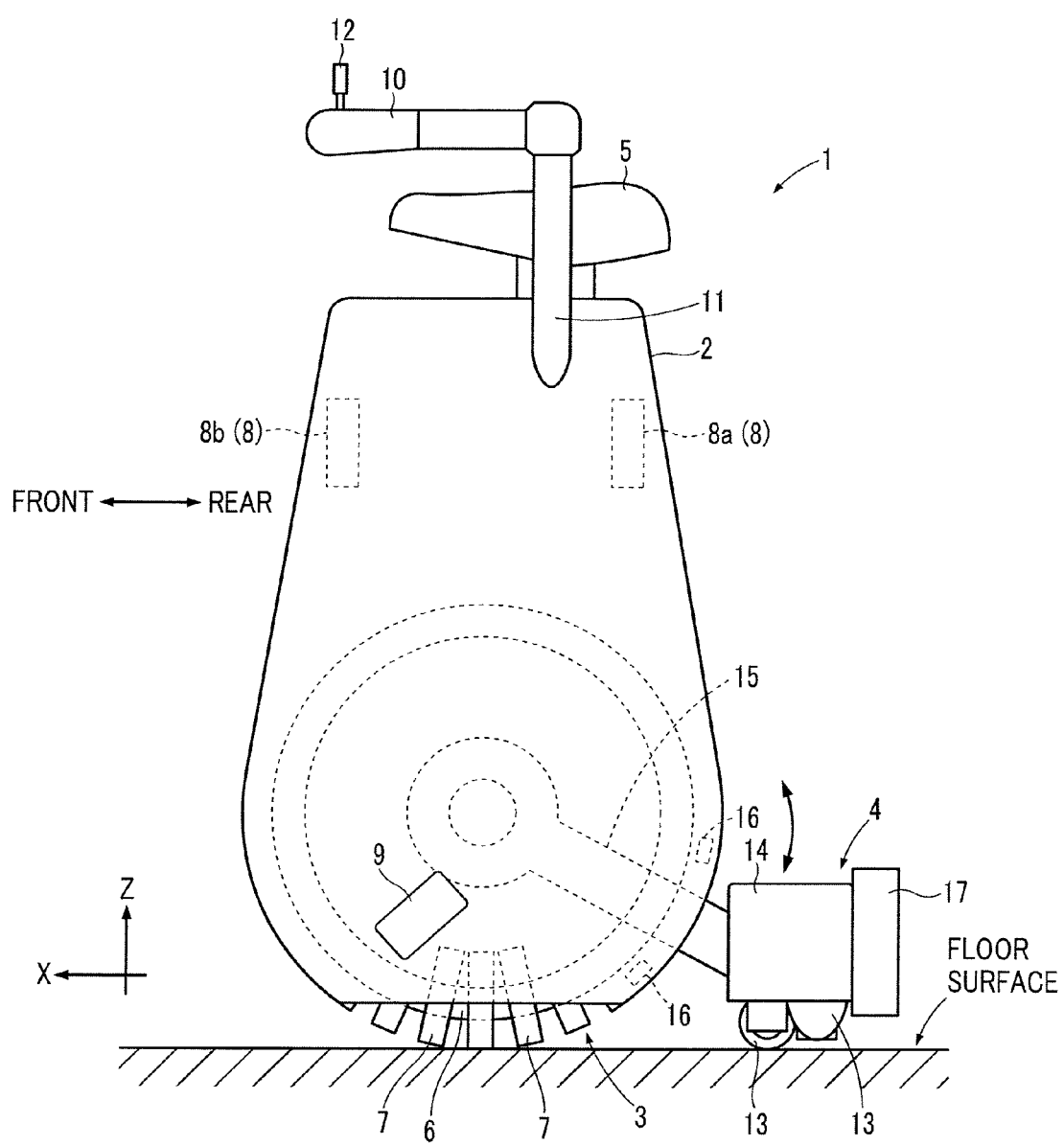
FIG. 2 is a side view of the inverted pendulum type vehicle according to the first embodiment.

A first embodiment of the present invention will be described with reference to FIG. 1 to FIG. 9. As illustrated in FIG. 1 and FIG. 2, an inverted pendulum type vehicle 1 according to the present embodiment (hereinafter referred to simply as the vehicle 1 in some cases) has a base body 2, a first travel operation unit 3 and a second travel operation unit 4, which are capable of traveling on a floor surface, and a rider mounting section 5 on which a rider mounts.

The first travel operation unit 3 includes a circular core member 6 shown in FIG. 2 (hereinafter referred to as the annular core member 6) and a plurality of circular rollers 7 mounted on the annular core member 6 such that the circular rollers 7 are arranged at equiangular intervals in the circumferential direction (in the direction about the axial center) of the annular core member 6. Each of the rollers 7 is externally inserted into the annular core member 6 with its rotational axial center directed toward the circumference of the annular core member 6. Further, each of the rollers 7 is configured to be rotatable integrally with the annular core member 6 about the axial center of the annular core member 6. In addition, each of the rollers 7 is configured to be rotatable about the central axis of the cross-sectional plane of the annular core member 6 (the circumferential axis about the axial center of the annular core member 6).

The first travel operation unit 3 having the annular core member 6 and the plurality of the rollers 7 comes in contact with a floor surface through the intermediary of the rollers 7 (the rollers 7 positioned in a lower portion of the annular core member 6), the axial center of the annular core member 6 being directed in parallel to the floor surface. In this ground contact state, the annular core member 6 is rotatively driven about the axial center thereof so as to cause all the annular core member 6 and the rollers 7 to circumrotate. This in turn causes the first travel operation unit 3 to travel on the floor surface in a direction orthogonal to the axial center of the annular core member 6. In the ground contact state, rotatively driving the rollers 7 about their rotational axial centers causes the first travel operation unit 3 to travel in the direction of the axial center of the annular core member 6.

Further, rotatively driving the annular core member 6 and rotatively driving the rollers 7 cause the first travel operation unit 3 to travel in a direction at an angle with respect to the direction orthogonal to the axial center of the annular core member 6 and the direction of the axial center of the annular core member 6.

Thus, the first travel operation unit 3 is capable of traveling on the floor surface in all directions. In the following description, of the traveling directions of the first travel operation unit 3, the direction orthogonal to the axial center of the annular core member 6 is defined as X-axis direction, the direction of the axial center of the annular core member 6 is defined as Y-axis direction, and a vertical direction is defined as Z-axis direction, as illustrated in FIG. 1 and FIG. 2. In addition, a front direction is defined as the positive direction of the X-axis, a left direction is defined as the positive direction of the Y-axis, and an upper direction is defined as a positive direction of the Z-axis.

The first travel operation unit 3 is installed to the base body 2. More specifically, the base body 2 is provided, covering the first travel operation unit 3 except for a lower portion thereof in contact with the floor surface. Further, the base body 2 supports the annular core member 6 of the first travel operation unit 3 such that the annular core member 6 is rotatable about the axial center thereof.

In this case, the base body 2 uses the axial center of the annular core member 6 of the first travel operation unit 3 as the supporting point thereof and the base body 2 can be tilted about the axial center (about the Y-axis). Further, the base body 2 is tiltable about the X-axis orthogonal to the axial center of the annular core member 6 by tilting together with the first travel operation unit 3 relative to the floor surface, the ground contact portion of the first travel operation unit 3 being the supporting point. Thus, the base body 2 is tiltable about two axes relative to the vertical direction.

The base body 2 includes therein a first actuator 8, which generates a driving force for moving the first travel operation unit 3, as illustrated in FIG. 2. The first actuator 8 is constituted of an electric motor 8a serving as the actuator that rotatively drives the annular core member 6 and an electric motor 8b serving as the actuator that rotatively drives the rollers 7. The electric motors 8a and 8b impart rotative driving forces to the annular core member 6 and the rollers 7 through the intermediary of a motive power transmitting mechanisms (not shown). The motive power transmitting mechanisms may have publicly known constructions.

The first travel operation unit 3 may have a construction different from the aforesaid construction. For example, the first travel operation unit 3 and the driving system thereof may adopt the constructions proposed by the applicant of the present application in PCT WO/2008/132778 or PCT WO/2008/132779.

Further, the rider mounting section 5 is installed to the base body 2. The rider mounting section 5 is formed of a seat, on which a rider sits, and fixed to the upper end portion of the base body 2. A rider can sit on the rider mounting section 5, the longitudinal direction thereof being the X-axis direction and the lateral direction thereof being the Y-axis direction. The rider mounting section 5 (the seat) is secured to the base body 2, so that the rider mounting section 5 can be tilted integrally with the base body 2 relative to the vertical direction.

Further attached to the base body 2 are a pair of footrests 9 and 9, on which the rider sitting on the rider mounting section 5 places his/her feet, and a pair of handles 10 and 10 held by the rider.

The footrests 9 and 9 are protrusively provided in lower portions of both sides of the base body 2. In FIG. 1 and FIG. 2, one (the right one) of the footrests 9 is not shown.

The handles 10 and 10 are formed of bar-like members disposed extendedly in the X-axis direction (the longitudinal direction) on both sides of the rider mounting section 5 and are respectively fixed to the base body 2 through rods 11 extended from the base body 2. Further, a joystick 12 serving as an operation device is attached to one handle 10 (the right handle 10 in the drawing) of the pair of handles 10 and 10.

The joystick 12 can be swung in the longitudinal direction (the X-axis direction) and the lateral direction (the Y-axis direction). The joystick 12 outputs an operation signal indicative of the amount of swing in the longitudinal direction (the X-axis direction) as a command for moving the vehicle 1 forward or backward. The joystick 12 also outputs an operation signal indicative of the amount of swing in the lateral direction (the Y-axis direction) as a command for turning the vehicle 1 to the right (clockwise) or the left (counterclockwise), i.e., a turning command.

Regarding the amount of swing of the joystick 12 in the longitudinal direction, i.e., the amount of rotation about the Y-axis, in the present embodiment, the amount of a forward swing is positive, while the amount of a backward swing is negative. Regarding the amount of a lateral swing of the joystick 12, i.e., the amount of rotation about the X-axis, the amount of a leftward swing is positive, while the amount of a rightward swing is negative.

The second travel operation unit 4 in the present embodiment is formed of a so-called omniwheel. The omniwheel constituting the second travel operation unit 4 has a publicly known structure, which includes a pair of coaxial annular core members (not shown) and a plurality of barrel-like rollers 13 rotatably and externally inserted in each of the annular core members with the rotational axial centers thereof oriented in the circumferential direction of the annular core member.

In this case, the second travel operation unit 4 is disposed at the rear of the first travel operation unit 3 with the axial centers of the pair of annular core members thereof oriented in the X-axis direction (the longitudinal direction) and is in contact with a floor surface through the rollers 13.

The roller 13 of one of the pair of annular core members and the roller 13 of the other thereof are arranged such that the phases thereof are shifted in the peripheral directions of the annular core members. The rollers 13 are further configured such that either the roller 13 of one of the pair of annular core members or the roller 13 of the other thereof comes in contact with the floor surface when the pair of annular core members rotates.

The second travel operation unit 4 constituted of the omniwheel is joined to the base body 2. More specifically, the second travel operation unit 4 is provided with a housing 14 that covers an upper portion of the omniwheel (all the pair of annular core members and the plurality of the rollers 13). The pair of annular core members of the omniwheel is rotatably supported by the housing 14 such that the pair of annular core members is rotatable about the axial centers thereof. Further, an arm 15 extended from the housing 14 to the base body 2 is rotatably supported by the base body 2 such that the arm 15 is swingable about the axial center of the annular core member 6 of the first travel operation unit 3. Thus, the second travel operation unit 4 is joined to the base body 2 through the arm 15.

Further, the second travel operation unit 4 is swingable, relative to the base body 2, about the axial center of the annular core member 6 of the first travel operation unit 3 by the swing of the arm 15. This allows the rider mounting section 5 to tilt together with the base body 2 about the Y-axis while maintaining both the first travel operation unit 3 and the second travel operation unit 4 to be in contact with the ground.

Alternatively, the arm 15 may be rotatably supported by the axial center portion of the annular core member 6 of the first travel operation unit 3, and the second travel operation unit 4 may be joined to the first travel operation unit 3 through the arm 15.

The base body 2 is provided with a pair of stoppers 16 and 16 that restricts the swing range of the arm 15. Hence, the arm 15 is allowed to swing within the range defined by the stoppers 16 and 16. This restricts the swing range of the second travel operation unit 4 about the axial center of the annular core member 6 of the first travel operation unit 3 and consequently the range of tilt of the base body 2 and the rider mounting section 5 about the X-axis. As a result, the base body 2 and the rider mounting section 5 are prevented from excessively tilting toward the rear side of the rider.

The second travel operation unit 4 may be urged by a spring so as to be pressed against the floor surface.

As described above, the second travel operation unit 4 is capable of traveling on the floor surface in all directions, including the X-axis direction and the Y-axis direction, as with the first travel operation unit 3, by rotating one or both of the pair of annular core members and the rollers 13. More specifically, the rotation of the annular core members enables the second travel operation unit 4 to travel in the Y-axis direction, i.e., the lateral direction. Further, the rotation of the rollers 13 enables the second travel operation unit 4 to travel in the X-axis direction, i.e., the longitudinal direction.

An electric motor 17 serving as the second actuator, which drives the second travel operation unit 4, is attached to the housing 14 of the second travel operation unit 4. The electric motor 17 is joined to the pair of annular core members so as to rotatively drive the pair of annular core members of the second travel operation unit 4.

Thus, according to the present embodiment, the travel of the second travel operation unit 4 in the X-axis direction is adapted to passively follow the travel of the first travel operation unit 3 in the X-axis direction. Further, the travel of the second travel operation unit 4 in the Y-axis direction is implemented by rotatively driving the pair of annular core members of the second travel operation unit 4 by the electric motor 17.

Supplementarily, the second travel operation unit 4 may have the same construction as that of the first travel operation unit 3.

The above has described the mechanical configuration of the vehicle 1 according to the present embodiment.

Figure 3:
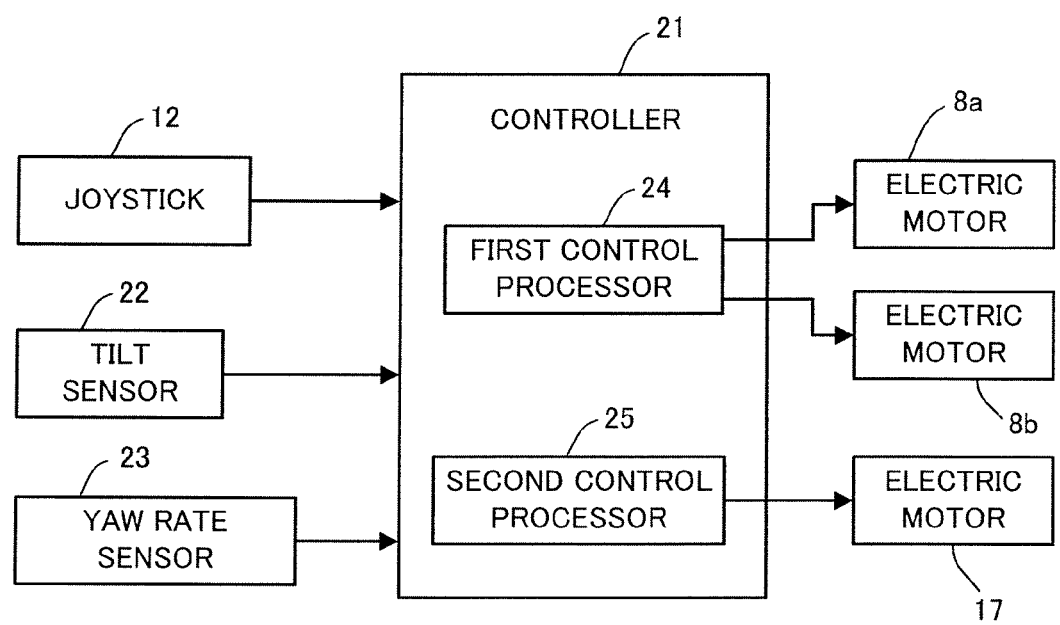
FIG. 3 is a block diagram illustrating the configuration for controlling the inverted pendulum type vehicle according to the first embodiment.

Although not shown in FIG. 1 and FIG. 2, in order to control the operation of the vehicle 1, i.e., to control the operations of the first travel operation unit 3 and the second travel operation unit 4, the base body 2 of the vehicle 1 in the present embodiment incorporates a controller 21 constituted of an electronic circuit unit, which includes a CPU, a RAM, a ROM and the like, a tilt sensor 22 for measuring the tilt angle of the rider mounting section 5 (the tilt angle of the base body 2) relative to the vertical direction, and a yaw rate sensor 23 for measuring the angular velocity of the vehicle 1 about the yaw axis, as illustrated in FIG. 3.

The controller 21 receives outputs of the joystick 12 and detection signals of the tilt sensor 22 and the yaw rate sensor 23.

The controller 21 may alternatively be constituted of a plurality of electronic circuit units adapted to communicate with each other.

The tilt sensor 22 is constituted of, for example, an acceleration sensor and an angular velocity sensor, such as a gyro sensor. The controller 21 uses a publicly known method to acquire the measurement value of the tilt angle of the rider mounting section 5, i.e., the tilt angle of the base body 2, from the detection signals of the acceleration sensor and the angular velocity sensor. As the method, the one proposed by the applicant of the present application in, for example, Japanese Patent No. 4181113.

More specifically, the tilt angle of the rider mounting section 5 (or the tilt angle of the base body 2) in the present embodiment is the tilt angle (a set of a tilt angle in the direction about the X-axis and a tilt angle in the direction about the Y-axis), which uses, as its reference (zero), the posture of the rider mounting section 5 (or the base body 2) in a state wherein the center of gravity of the combination of the vehicle 1 and the rider mounted on the rider mounting section 5 in a predetermined posture (standard posture) is positioned right above the ground contact portion of the first travel operation unit 3 (upward in the vertical direction).

The yaw rate sensor 23 is composed of an angular velocity sensor, such as a gyro sensor. Based on a detection signal of the yaw rate sensor 23, the controller 21 acquires the measurement value of the angular velocity of the vehicle 1 about the yaw axis.

To provide a function implemented by an installed program or the like (a function implemented by software) or a function implemented by hardware in addition to the function for acquiring the measurement values as described above, the controller 21 further includes a first control processor 24, which controls the electric motors 8a and 8b constituting the first actuator 8 thereby to control the traveling motion of the first travel operation unit 3 and a second control processor 25, which controls the electric motor 17 serving as the second actuator thereby to control the traveling motion of the second travel operation unit 4. The first control processor 24 and the second control processor 25 correspond to a first control unit and a second control unit, respectively, in the present invention.

The first control processor 24 carries out the arithmetic processing, which will be discussed hereinafter, to sequentially calculate a first desired velocity, which is the desired value of the traveling velocity (more specifically, the set of a translational velocity in the X-axis direction and a translational velocity in the Y-axis direction) of the first travel operation unit 3. Then, the first control processor 24 controls the rotational speed of each of the electric motors 8a and 8b thereby to match the actual traveling velocity of the first travel operation unit 3 to the first desired velocity.

In this case, the relationship between the rotational speed of each of the electric motors 8a and 8b and the actual traveling velocity of the first travel operation unit 3 is established beforehand. Hence, the desired value of the rotational speed of each of the electric motors 8a and 8b is specified on the basis of the first desired velocity of the first travel operation unit 3. Then, the rotational speeds of the electric motors 8a and 8b are feedback-controlled to the desired values specified on the basis of the first desired velocity, thereby controlling the actual traveling velocity of the first travel operation unit 3 to the first desired velocity.

Further, the second control processor 25 carries out the arithmetic processing, which will be discussed hereinafter, to sequentially calculate a second desired velocity, which is the desired value of the traveling velocity (more specifically, the translational velocity in the Y-axis direction) of the second travel operation unit 4. Then, the second control processor 25 controls the rotational speed of the electric motor 17 thereby to match the actual traveling velocity of the second travel operation unit 4 in the Y-axis direction to the second desired velocity.

In this case, the relationship between the rotational speed of the electric motor 17 and the actual traveling velocity of the second travel operation unit 4 in the Y-axis direction is established beforehand, as with the case of the first travel operation unit 3. Hence, the desired value of the rotational speed of the electric motor 17 is specified on the basis of the second desired velocity of the second travel operation unit 4. Then, the rotational speed of the electric motor 17 is feedback-controlled to the desired values specified on the basis of the second desired velocity, thereby controlling the actual traveling velocity of the second travel operation unit 4 in the Y-axis direction to the second desired velocity.

Supplementarily, according to the present embodiment, the travel of the second travel operation unit 4 in the X-axis direction is passively implemented by following the travel of the first travel operation unit 3 in the X-axis direction. Hence, there is no need to set the desired value of the traveling velocity of the second travel operation unit 4 in the X-axis direction.

In the explanation of the embodiments in the present description, the velocity of the first travel operation unit 3 means the moving velocity of the ground contact point of the first travel operation unit 3 unless otherwise specified. Similarly, the velocity of the second travel operation unit 4 means the moving velocity of the ground contact point of the second travel operation unit 4 unless otherwise specified.

The processing by the fist control processor 24 and the second control processor 25 will now be described in further detail. First, the processing by the first control processor 24 will be described with reference to FIG. 4 to FIG. 7.

Figure 4:
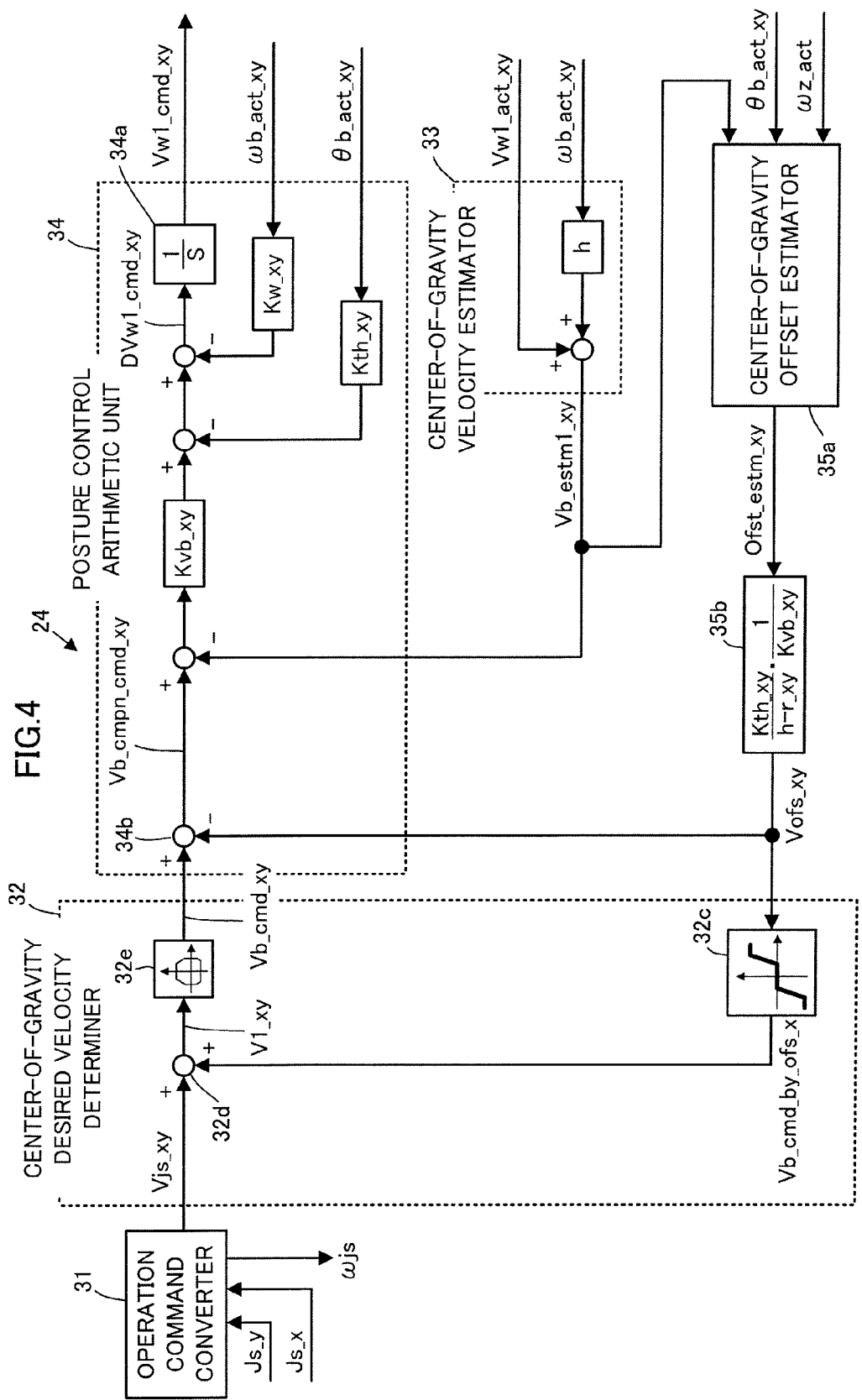
FIG. 4 is a block diagram illustrating the processing by a first control processor shown in FIG. 3.

As illustrated in FIG. 4, the first control processor 24 has, as major functional units thereof, an operation command converter 31 which converts the swing amount of the joystick 12 in the longitudinal direction (the amount of rotation about the Y-axis) Js_x and the swing amount thereof in the lateral direction (the amount of rotation about the X-axis) Js_y, which are indicated by an operation signal input from the joystick 12, into a velocity command for the travel of the vehicle 1, a center-of-gravity desired velocity determiner 32 which determines the desired velocity of the total center of gravity of the combination of the vehicle 1 and the rider on the rider mounting section 5 (hereinafter referred to as the vehicle system total center of gravity), a center-of-gravity velocity estimator 33 which estimates the velocity of the vehicle system total center of gravity, and a posture control arithmetic unit 34 which determines the desired value of the traveling velocity of the first travel operation unit 3 such that the posture of the rider mounting section 5, i.e., the posture of the base body 2, is stabilized while making the estimated velocity of the vehicle system total center of gravity follow a desired velocity. The first control processor 24 carries out the processing by the aforesaid functional units at a predetermined arithmetic processing cycle of the controller 21.

In the present embodiment, the vehicle system total center of gravity has a meaning as an example of the representative point of the vehicle 1. Accordingly, the velocity of the vehicle system total center of gravity has a meaning as the translational moving velocity of the representative point.

Before specifically describing the processing carried out by each of the functional units of the first control processor 24, the basic matters of the processing will be described. The dynamic behavior of the vehicle system total center of gravity (more specifically, the behavior observed from the Y-axis direction and the behavior observed from the X-axis direction) is approximately expressed by an inverted pendulum model shown in FIG. 5. The algorithm of the processing by the first control processor 24 is created on the basis of the behavior.

In the following description and FIG. 5, a suffix "_x" means a reference code of a variable or the like observed from the Y-axis direction, while a suffix "_y" means a reference code of a variable or the like observed from the X-axis direction. Further, in FIG. 5, the reference codes of the variables observed from the Y-axis direction are not parenthesized, while the reference codes of the variables observed from the X-axis direction are parenthesized in order to illustrate both an inverted pendulum model observed from the Y-axis direction and an inverted pendulum model observed from the X-axis direction.

The inverted pendulum model expressing the behavior of the vehicle system total center of gravity observed from the Y-axis direction has a virtual wheel 61_x which has a rotational axial center parallel to the Y-axis direction and which is circumrotatable on a floor surface (hereinafter referred to as "the virtual wheel 61_x"), a rod 62_x which is extended from the rotational center of the virtual wheel 61_x and which is swingable about the rotational axis of the virtual wheel 61_x (in the direction about the Y-axis direction), and a mass point Ga_x connected to a reference portion Ps_x, which is the distal end portion (upper end portion) of the rod 62_x.

In the inverted pendulum model, it is assumed that the movement of the mass point Ga_x corresponds to the movement of the vehicle system total center of gravity observed from the Y-axis direction, and a tilt angle θb_x (the angle of a tilt in the direction about the Y-axis) of the rod 62_x relative to the vertical direction agrees with the angle of a tilt of the rider mounting section 5 (or the base body 2) in the direction about the Y-axis. Further, the translational movement of the first travel operation unit 3 in the X-axis direction corresponds to the translational movement in the X-axis direction by the circumrotation of the virtual wheel 61_x.

Further, a radius r_x of the virtual wheel 61_x and a height h_x of each of the reference portion Ps_x and the mass point Ga_x from the floor surface are set to predetermined values (fixed values) set beforehand.

Similarly, the inverted pendulum model expressing the behavior of the vehicle system total center of gravity observed from the X-axis direction has a virtual wheel 61_y which has a rotational axial center parallel to the X-axis direction and which is circumrotatable on the floor surface (hereinafter referred to as "the virtual wheel 61_y"), a rod 62_y which is extended from the rotational center of the virtual wheel 61_y and which is swingable about the rotational axis of the virtual wheel 61_y (in the direction about the X-axis direction), and a mass point Ga_y connected to a reference portion Ps_y, which is the distal end portion (upper end portion) of the rod 62_y.

In the inverted pendulum model, it is assumed that the movement of the mass point Ga_y corresponds to the movement of the vehicle system total center of gravity observed from the X-axis direction, and a tilt angle θb_y (the angle of a tilt in the direction about the X-axis) of the rod 62_y relative to the vertical direction agrees with the angle of a tilt of the rider mounting section 5 (or the base body 2) in the direction about the X-axis. Further, the translational movement of the first travel operation unit 3 in the Y-axis direction corresponds to the translational movement in the Y-axis direction by the circumrotation of the virtual wheel 61_y.

Further, a radius r_y of the virtual wheel 61_y and a height h_y of each of the reference portion Ps_y and the mass point Ga_y from the floor surface are set to predetermined values (fixed values) set beforehand. The height h_y of each of the reference portion Ps_y and the mass point Ga_y from the floor surface observed in the X-axis direction is the same as the height h_x of each of the reference portion Ps_x and the mass point Ga_x from the floor surface observed in the Y-axis direction. Hereinafter, therefore, h_x=h_y=h will apply.

The positional relationship between the reference portion Ps_x and the mass point Ga_x observed from the Y-axis direction will be supplementarily described. The position of the reference portion Ps_x corresponds to the position of the vehicle system total center of gravity in the case where it is assumed that the rider mounting (sitting) on the rider mounting section 5 is motionless in a predetermined neutral posture relative to the rider mounting section 5. In this case, therefore, the position of the mass point Ga_x agrees with the position of the reference portion Ps_x. The same applies to the positional relationship between the reference portion Ps_y and the mass point Ga_y observed from the X-axis direction.

In practice, however, when the rider on the rider mounting section 5 moves his/her upper body or the like relative to the rider mounting section 5 (or the base body 2), the positions of the actual vehicle system total center of gravity in the X-axis direction and the Y-axis direction will usually shift from the positions of the reference portions Ps_x and Ps_y, respectively, in the horizontal direction. For this reason, the positions of the mass points Ga_x and Ga_y, which are shown in FIG. 5, are shifted from the positions of the reference portions Ps_x and Ps_y, respectively.

The behavior of the vehicle system total center of gravity represented by the inverted pendulum model described above is denoted by the following expressions (1a), (1b), (2a) and (2b). In this case, expressions (1a) and (1b) denote the behaviors observed in the Y-axis direction, while expressions (2a) and (2b) denote the behaviors observed in the X-axis direction.

$$Vb\_x = Vw1\_x + h \cdot \omega b\_x \qquad (1a)$$

$$dVb\_x/dt = (g/h) \cdot (\theta b\_x \cdot (h - r\_x) + \text{Ofst}\_x) + \omega z \cdot Vb\_y \qquad (1b)$$

$$Vb\_y = Vw1\_y + h \cdot \omega b\_y \qquad (2a)$$

$$dVb\_y/dt = (g/h) \cdot (\theta b\_y \cdot (h - r\_y) + \text{Ofst}\_y) - \omega z \cdot Vb\_x \qquad (2b)$$

where Vb_x denotes the velocity of the vehicle system total center of gravity in the X-axis direction (the translational velocity); θb_x denotes the tilt angle of the rider mounting section 5 (or the base body 2) in the direction about the Y-axis; Vw1_x denotes the moving velocity (the translational velocity) of the virtual wheel 61_x in the X-axis direction; ωb_x denotes the temporal change rate of θb_x (=dθb_x/dt); Ofst_x denotes the amount of a shift of the position of the vehicle system total center of gravity in the X-axis direction (the position of the mass point Ga_x in the X-axis direction) from the position of the reference portion Ps_x in the X-axis direction; Vb_y denotes the velocity of the vehicle system total center of gravity in the Y-axis direction (the translational velocity); Vw1_y denotes the moving velocity (the translational velocity) of the virtual wheel 61_y in the Y-axis direction; θb_y denotes the tilt angle of the rider mounting section 5 (or the base body 2) in the direction about the X-axis; and ωb_y denotes the temporal change rate of θb_y (=dθb_y/dt); and Ofst_y denotes the amount of shift of the position of the vehicle system total center of gravity in the Y-axis direction (the position of the mass point Ga_y in the Y-axis direction) from the position of the reference portion Ps_y in the Y-axis direction.

Further, ωz denotes a yaw rate (the angular velocity in the direction about the yaw axis) when the vehicle 1 turns, and g denotes a gravitational acceleration constant. The positive direction of θb_x and ωb_x is the direction in which the vehicle system total center of gravity tilts in the positive direction of the X-axis (forward), while the positive direction of θb_y and ωb_y is the direction in which the vehicle system total center of gravity tilts in the positive direction of the Y-axis (leftward). Further, the positive direction of ωz is the counterclockwise direction as the vehicle 1 is observed from above.

The second term of the right side of expression (1a), namely, (=h·ωb_x), denotes the translational velocity component of the reference portion Ps_x in the X-axis direction generated by a tilt of the rider mounting section 5 in the direction about the Y-axis. The second term of the right side of expression (2a), namely, (=h·ωb_y), denotes the translational velocity component of the reference portion Ps_y in the Y-axis direction generated by a tilt of the rider mounting section 5 in the direction about the X-axis.

Supplementarily, Vw1_x in expression (1a) specifically denotes a relative circumferential velocity of the virtual wheel 61_x with respect to the rod 62_x (in other words, with respect to the rider mounting section 5 or the base body 2). Hence, Vw1_x includes a velocity component (=r_x·ωb_x), which is generated when the rod 62_x tilts, in addition to the moving velocity of the ground contact point of the virtual wheel 61_x in the X-axis direction relative to the floor surface, i.e., the moving velocity of the ground contact point of the first travel operation unit 3 in the X-axis direction relative to the floor surface. The same applies to Vw1_y in expression (1b).

Further, the first term of the right side of expression (1b) denotes an acceleration component in the X-axis direction generated at the vehicle system total center of gravity by a component in the X-axis direction (F_x in FIG. 5) of a floor reaction force (F in FIG. 5) acting on the ground contact portion of the virtual wheel $61\_x$ according to the amount of shift ($=\theta b\_x \cdot (h-r\_x) + Ofst\_x$) of the position of the vehicle system total center of gravity in the X-axis direction (the position of the mass point Ga_x in the X-axis direction) from the vertical upper position of the ground contact portion of the virtual wheel $61\_x$ (the ground contact portion of the first travel operation unit 3 observed from the Y-axis direction). The second term of the right side of expression (1b) denotes the acceleration component in the X-axis direction generated by a centrifugal force acting on the vehicle 1 at the time of turning at the yaw rate of $\omega z$.

Similarly, the first term of the right side of expression (2b) denotes an acceleration component in the Y-axis direction generated at the vehicle system total center of gravity by a component in the Y-axis direction (F_y in FIG. 5) of a floor reaction force (F in FIG. 5) acting on the ground contact portion of the virtual wheel $61\_y$ according to the amount of deviation ($=\theta b\_y \cdot (h-r\_y) + Ofst\_y$) of the position of the vehicle system total center of gravity in the Y-axis direction (the position of the mass point Ga_y in the Y-axis direction) from the vertical upper position of the ground contact portion of the virtual wheel $61\_y$ (the ground contact portion of the first travel operation unit 3 observed from the X-axis direction). The second term of the right side of expression (2b) denotes the acceleration component in the Y-axis direction generated by a centrifugal force acting on the vehicle 1 at the time of turning at the yaw rate of $\omega z$.

Figure 6:
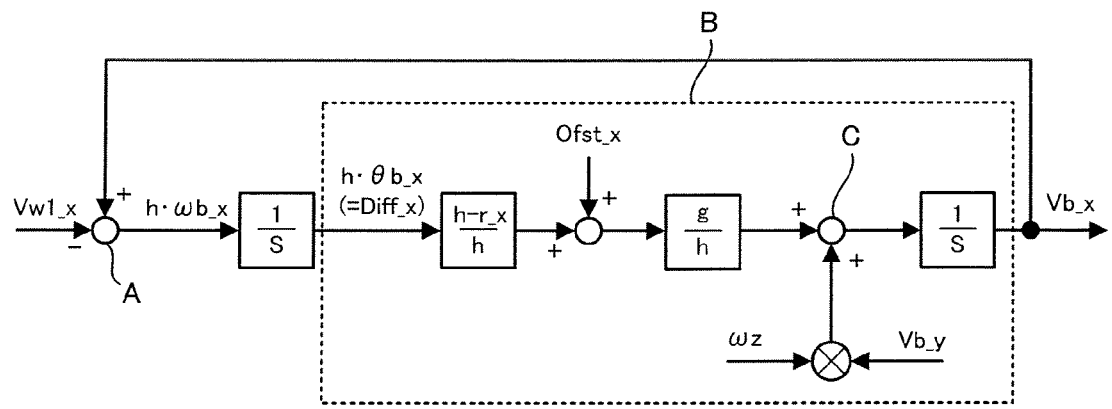
FIG. 6 is a block diagram illustrating behaviors related to the inverted pendulum model shown in FIG. 5.

The behaviors (the behaviors observed in the X-axis direction) represented by expressions (1a) and (1b) described above are illustrated by the block diagram of FIG. 6. In the diagram, 1/s denotes integration operation.

Further, the processing by an arithmetic unit indicated by reference character A in FIG. 6 corresponds to the relational expression of expression (1a), while the processing by an arithmetic unit indicated by reference character B corresponds to the relational expression of expression (1b).

Figure 5:
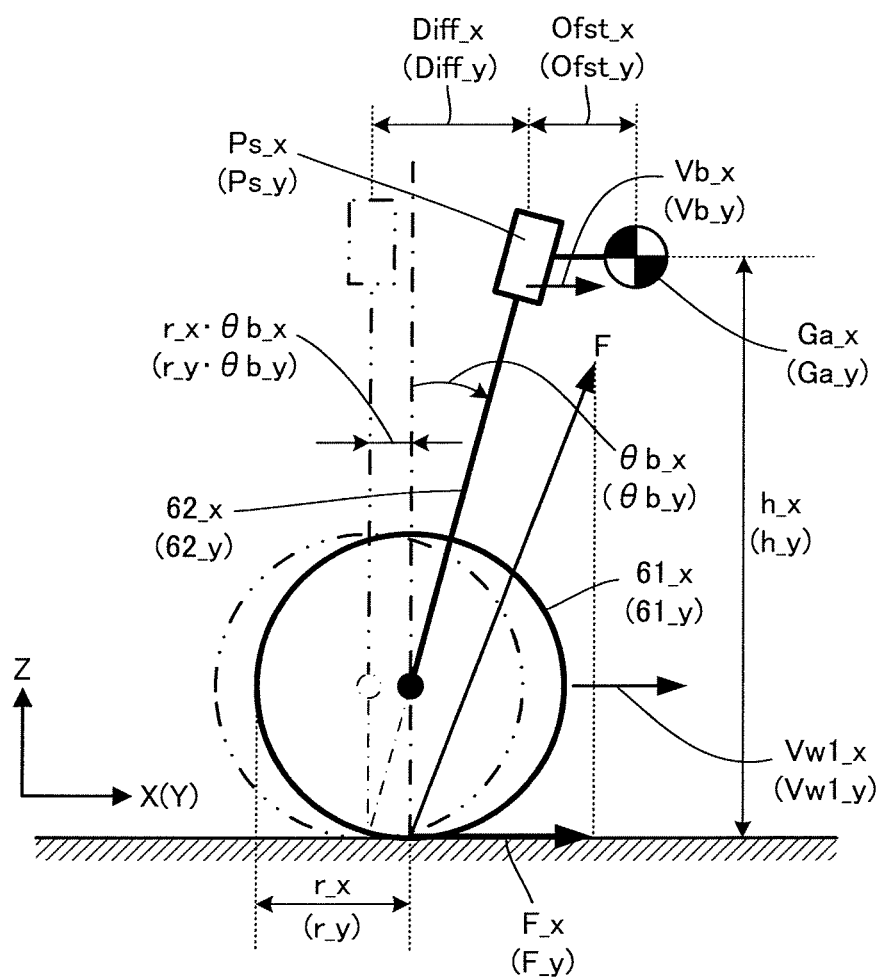
FIG. 5 is a diagram illustrating an inverted pendulum mode used for the processing by the first control processor shown in FIG. 3.

In FIG. 6, $h \cdot \theta b\_x$ approximately coincides with Diff_x shown in FIG. 5.

Meanwhile, the block diagram representing the behaviors indicated by expressions (2a) and (2b), i.e., the behaviors observed in the Y-axis direction, is obtained by replacing the suffix "_x" in FIG. 6 by "_y" and by replacing the sign "+" of the acceleration component (the acceleration component generated by the centrifugal force) at the lower side in the drawing, which is one of the inputs to an adder denoted by reference character C, by "−."

According to the present embodiment, the algorithm of the processing by the first control processor 24 is created on the basis of the behavior model (inverted pendulum model) of the vehicle system total center of gravity that considers the centrifugal force and the amount of the shift of the vehicle system total center of gravity from the reference portions Ps_x and Ps_y, as described above.

Based on the above, the processing by the first control processor 24 will be specifically described. In the following description, the set of the value of a variable related to the behavior observed from the Y-axis direction and the value of a variable related to the behavior observed from the X-axis direction will be denoted by adding a suffix "_xy" in some cases.

Referring to FIG. 4, the first control processor 24 first carries out the processing by the operation command converter 31 and the processing by the center-of-gravity velocity estimator 33 at each arithmetic processing cycle of the controller 21.

Figure 7:
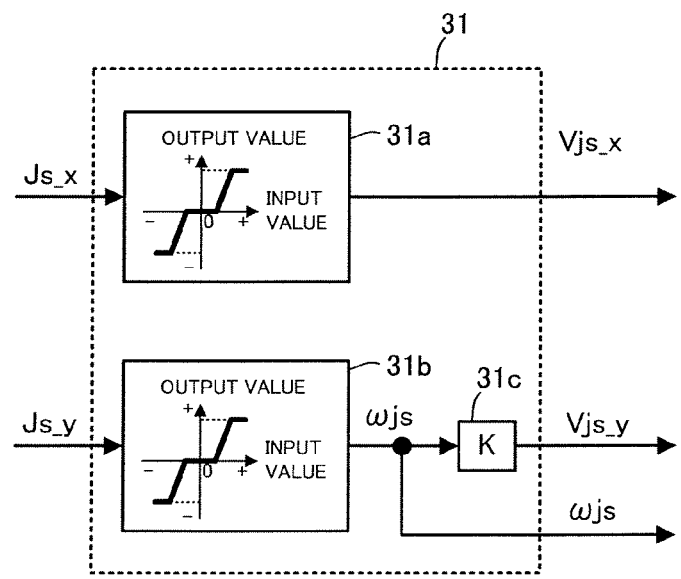
FIG. 7 is a block diagram illustrating the processing by an operation command converter shown in FIG. 4.

As illustrated in FIG. 7, the operation command converter 31 determines a basic velocity command Vjs_xy, which is the basic command value of the traveling velocity (the translational velocity) of the first travel operation unit 3 and a basic turn angular velocity command $\omega js$, which is the basic command value of the angular velocity in the direction about the yaw axis when the vehicle 1 turns, on the basis of the amount of swing of the joystick 12 in the Y-axis direction (i.e., the amount of rotation about the X-axis) Js_y and the amount of swing of the joystick 12 in the X-axis direction (i.e., the amount of rotation about the Y-axis) Js_x.

Of the aforesaid basic velocity command Vjs_xy, the basic velocity command Vjs_x in the X-axis direction is determined by a processor 31a on the basis of the amount of swing of the joystick 12 in the X-axis direction Js_x. More specifically, if the amount of swing Js_x is an amount of swing in the positive direction (an amount of a forward swing), then the basic velocity command in the X-axis direction Vjs_x will be a velocity command for a forward movement direction of the vehicle 1 (a positive velocity command). Further, if the amount of swing Js_x is an amount of swing in the negative direction (an amount of a backward swing), then the basic velocity command in the X-axis direction Vjs_x will be a velocity command for a backward movement direction of the vehicle 1 (a negative velocity command). In this case, the magnitude of the basic velocity command in the X-axis direction Vjs_x is determined such that it increases to a predetermined upper limit value or less as the magnitude of the amount of swing of the joystick 12 in the X-axis direction (the forward or the backward direction) Js_x increases.

A predetermined range in which the magnitude of a swing amount of the joystick 12 in the positive direction or the negative direction Js_x is sufficiently small may be defined as a dead zone, and the basic velocity command in the X-axis direction Vjs_x may be set to zero for a swing amount in the dead zone. The graph shown in the processor 31a in FIG. 7 indicates the relationship between an input (Js_x) and an output (Vjs_x) in the case where the dead zone is involved.

Of the basic velocity commands Vjs_xy, the basic velocity command Vjs_y in the Y-axis direction is determined as the velocity command in the Y-axis direction of the first travel operation unit 3 for a turn of the vehicle 1 on the basis of the a swing amount of the joystick 12 in the Y-axis direction Js_y. More specifically, if the swing amount Js_y is a swing amount in the negative direction (a rightward swing amount), then the basic velocity command Vjs_y in the Y-axis direction will be a leftward velocity command (a positive velocity command) of the vehicle 1. Further, if the swing amount Js_y is a swing amount in the positive direction (a leftward swing amount), then the basic velocity command Vjs_y in the Y-axis direction will be the rightward velocity command (a negative velocity command) of the vehicle 1. In this case, the magnitude of the basic velocity command in the Y-axis direction Vjs_y is determined such that it increases to a predetermined upper limit value or less as the magnitude of the swing amount of the joystick 12 in the Y-axis direction (rightward or leftward) increases.

More specifically, the basic velocity command in the Y-axis direction Vjs_y is determined, together with a basic turn angular velocity command $\omega js$, on the basis of the swing amount of the joystick 12 in the Y-axis direction Js_y. For example, as illustrated in FIG. 7, the basic turn angular velocity command $\omega js$, which is the basic command value of the angular velocity in the direction about the yaw axis when the vehicle 1 turns, is determined on the basis of the swing amount of the joystick 12 in the Y-axis direction Js_y by the processing carried out by a processor 31b. In this case, if the swing amount of the joystick 12 Js_y is a swing amount in the negative direction (the rightward swing amount), then the basic turn angular velocity command ωjs will be an angular velocity command of a right-hand (clockwise) turn, i.e., a negative angular velocity command. If the swing amount of the joystick 12 Js_y is a swing amount in the positive direction (leftward swing amount), then the basic turn angular velocity command ωjs will be an angular velocity command of a left-hand (counterclockwise) turn, i.e., a positive angular velocity command. In this case, the magnitude of the basic turn angular velocity command ωjs is determined such that it increases to a predetermined upper limit value or less as the magnitude of the swing amount of the joystick 12 in the Y-axis direction increases.

Further, a processor 31c determines the basic velocity command in the Y-axis direction Vjs_y of the first travel operation unit 3 by multiplying the aforesaid basic turn angular velocity command ωjs by a negative value K, which is (−1) times a predetermined value (>0) set beforehand as the distance in the X-axis direction between an instantaneous turn center of the vehicle 1 and the ground contact point of the first travel operation unit 3.

Hence, the basic velocity command in the Y-axis direction Vjs_y of the first travel operation unit 3 is determined such that it is proportional to the basic turn angular velocity command ωjs, which is determined on the basis of the swing amount in the Y-axis direction Js_y of the joystick 12.

Alternatively, however, regarding the magnitude of the basic velocity command Vjs_y or the basic turn angular velocity command ωjs, a predetermined range in which the magnitude of a swing amount of the joystick 12 in the Y-axis direction is sufficiently small may be defined as a dead zone, and the basic velocity command in the Y-axis direction Vjs_y or the basic turn angular velocity command ωjs may be set to zero in the case of a swing amount falling in the dead zone. The graph given in the processor 31b in FIG. 7 indicates the relationship between inputs (Js_y) and outputs (ωjs) in the case where the dead zone is involved.

If the joystick 12 is operated in both the X-axis direction (the longitudinal direction) and the Y-axis direction (the lateral direction), then the magnitude of the basic velocity command in the Y-axis direction Vjs_y may be set so as to change according to the swing amount of the joystick 12 in the X-axis direction or the basic velocity command in the X-axis direction Vjs_x.

In the present embodiment, the state in which the basic turn angular velocity command ωjs (or the basic velocity command in the Y-axis direction Vjs_y) determined on the basis of the swing operation of the joystick 12 in the Y-axis direction (the lateral direction) is not zero corresponds to a state in which a turn command has been output from the joystick 12. Further, a state in which ωjs (or Vjs_y) is zero corresponds to a state in which the turn command has not been output from the joystick 12.

The center-of-gravity velocity estimator 33 calculates an estimated value of the velocity of the vehicle system total center of gravity Vb_estm1_xy according to the geometric (dynamic) relationship expressions given by the aforesaid expressions (1a) and (2a) in the inverted pendulum model.

More specifically, as illustrated by the block diagram in FIG. 4, the value of an actual translational velocity Vw1_act_xy of the first travel operation unit 3 and the value, which is obtained by multiplying an actual temporal change rate (tilt angular velocity) ωb_act_xy of a tilt angle θb_xy of the rider mounting section 5 by a height h of the vehicle system total center of gravity are added up to calculate the estimated value of the velocity of the vehicle system total center of gravity Vb_estm1_xy.

More specifically, the estimated value of the velocity in the X-axis direction Vb_estm1_x of the vehicle system total center of gravity and the estimated value of the velocity in the Y-axis direction Vb_estm1_y thereof are calculated according to the following expressions (3a) and (3b).

$$Vb\_estm1\_x = Vw1\_act\_x + h \cdot \omega b\_act\_x \quad (3a)$$

$$Vb\_estm1\_y = Vw1\_act\_y + h \cdot \omega b\_act\_y \quad (3b)$$

However, the temporal change rate of the offset amount Ofst_xy of the position of the vehicle system total center of gravity from the position of the reference portion Ps_xy (hereinafter referred to as the center-of-gravity offset amount Ofst_xy) is set to be sufficiently smaller than Vb_estm1_xy so as to be ignorable.

In this case, according to the present embodiment, desired values of the traveling velocity Vw1_cmd_x and Vw1_cmd_y (previous values) of the first travel operation unit 3 determined by the posture control arithmetic unit 34 at the previous arithmetic processing cycle are used as the values of Vw1_act_x and Vw1_act_y in the above calculation.

Alternatively, however, the rotational speeds of the electric motors 8a and 8b, for example, may be detected by a rotational velocity sensor, such as a rotary encoder. In this case, the latest values of Vw1_act_x and Vw1_act_y (i.e., the latest values of the measurement values of Vw1_act_x and Vw1_act_y) estimated from the detection values may be used for the calculation of expressions (3a) and (3b).

Further, according to the present embodiment, the latest values of the temporal change rates of the measurement values of the tilt angle θb of the rider mounting section 5 based on a detection signal of the tilt sensor 22 (i.e., the latest values of the measurement values of ωb_act_x and ωb_act_y) are used as the values of ωb_act_x and ωb_act_y.

After carrying out the processing by the operation command converter 31 and the center-of-gravity velocity estimator 33 as described above, the first control processor 24 carries out the processing by a center-of-gravity offset estimator 35a illustrated in FIG. 4 so as to determine a center-of-gravity offset amount estimated value Ofst_estm_xy, which is the estimated value of the center-of-gravity offset amount Ofst_xy.

Figure 8:
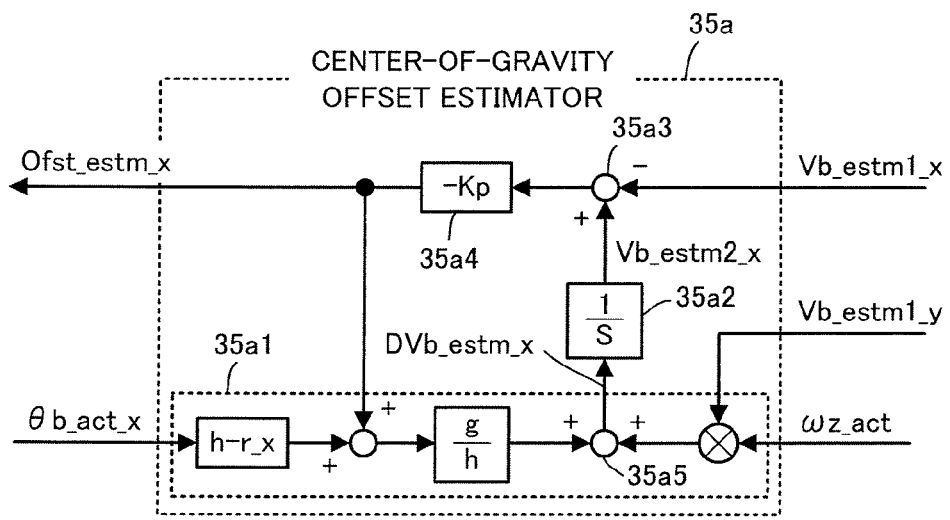
FIG. 8 is a block diagram illustrating the processing by an off-gravity-center estimator shown in FIG. 4.

The processing by the center-of-gravity offset estimator 35a is the processing indicated by the block diagram of FIG. 8. FIG. 8 representatively illustrates the processing for determining the estimated value of the center-of-gravity offset amount in the X-axis direction Ofst_estm_x of the estimated value of the center-of-gravity offset amount Ofst_estm_xy.

The processing in FIG. 8 will be specifically described. The center-of-gravity estimator 35a carries out the arithmetic processing of the right side of the aforesaid expression (1b) by an arithmetic unit 35a1 to calculate an estimated value of the translational acceleration of the vehicle system total center of gravity in the X-axis direction DVb_estm_x by using the measurement value (a latest value) of an actual tilt angle in the direction about the Y-axis θb_act_x of the rider mounting section 5 obtained from a detection signal of the tilt sensor 22, the measurement value (a latest value) of an actual yaw rate ωz_act of the vehicle 1 obtained from a detection signal of the yaw rate sensor 23, a first estimated value (a latest value) of the velocity of the vehicle system total center of gravity in the Y-axis direction Vb_estm1_y calculated by the center-of-gravity velocity estimator 33, and the estimated value of the center-of-gravity offset amount in the X-axis direction Ofst_estm_x (a previous value) determined at the previous arithmetic processing cycle.

The center-of-gravity offset estimator 35a further carries out the processing for integrating the estimated value of the translational acceleration in the X-axis direction DVb_estm_x of the vehicle system total center of gravity by an arithmetic unit 35a2 thereby to calculate a second estimated value of the velocity of the vehicle system total center of gravity in the X-axis direction Vb_estm2_x.

Subsequently, the center-of-gravity offset estimator 35a carries out the processing for calculating the difference between the second estimated value of the velocity of the vehicle system total center of gravity in the X-axis direction Vb_estm2_x (a latest value) and the first estimated value Vb_estm1_x (a latest value) thereof by an arithmetic unit 35a3.

Then, the center-of-gravity offset estimator 35a further carries out the processing for multiplying the difference by a gain (−Kp) of a predetermined value by an arithmetic unit 35a4 so as to determine the latest value of the estimated value of the center-of-gravity offset amount in the X-axis direction Ofst_estm_x.

The processing for determining the estimated value of the center-of-gravity offset amount in the Y-axis direction is also carried out in the same manner described above. More specifically, the block diagram illustrating the determination processing can be obtained by replacing the suffix "_x" in FIG. 8 by "_y" and by replacing the sign "+" of the acceleration component (an acceleration component generated by a centrifugal force) at right in the drawing, which is one of the inputs to an adder 35a5 included in the arithmetic unit 35a1, by "−".

Sequentially updating the estimated value of the center-of-gravity offset amount Ofst_estm_xy by the aforesaid processing carried out by the center-of-gravity offset estimator 35a makes it possible to converge Ofst_estm_xy to an actual value.

The first control processor 24 then carries out the processing by a center-of-gravity offset influence amount calculator 35b shown in FIG. 4 to calculate a center-of-gravity offset influence amount Vofs_xy.

The center-of-gravity offset influence amount Vofs_xy indicates the deviation of an actual center-of-gravity velocity from a desired velocity of the vehicle system total center of gravity in the case where the feedback control is conducted in the posture control arithmetic unit 34, which will be discussed hereinafter, without considering the deviation of the position of the vehicle system total center of gravity from the position of the reference portion Ps_xy in the inverted pendulum mode.

To be specific, the center-of-gravity offset influence amount calculator 35b multiplies each component of a newly determined estimated value of the center-of-gravity offset amount Ofst_estm_xy by a value denoted by (Kth_xy/(h_r_xy))/Kvb_xy, thereby calculating the center-of-gravity offset influence amount Vofs_xy.

Kth_xy denotes a gain value for determining a manipulated variable component which functions to bring the tilt angle of the rider mounting section 5 close to zero, i.e., to a desired tilt angle, in the processing by the posture control arithmetic unit 34, which will be hereinafter discussed. Further, Kvb_xy denotes a gain value for determining a manipulated variable component which functions to bring the difference between a desired velocity of the vehicle system total center of gravity Vb_cmd_xy and the first estimated value of the velocity of the vehicle system total center of gravity Vb_estm1_xy close to zero in the processing carried out by the posture control arithmetic unit 34, which will be hereinafter discussed.

The first control processor 24 then carries out the processing by the center-of-gravity desired velocity determiner 32 shown in FIG. 4 so as to calculate a restricted center-of-gravity desired velocity Vb_cmd_xy on the basis of the basic velocity command Vjs_xy determined by the operation command converter 31 and the center-of-gravity offset influence amount Vofs_xy determined by the center-of-gravity offset influence amount calculator 35b.

The center-of-gravity desired velocity determiner 32 first carries out the processing through a processor 32c shown in FIG. 4. The processor 32c carries out dead-zone processing and limiting related to the value of the center-of-gravity offset influence amount Vofs_xy thereby to determine a desired center-of-gravity velocity additive amount Vb_cmd_by_ofs_xy as a component based on the center-of-gravity offset of a desired value of the vehicle system total center of gravity.

More specifically, according to the present embodiment, if the magnitude of the center-of-gravity offset influence amount in the X-axis direction Vofs_x is a value within a dead zone, which is a predetermined range in the vicinity of zero, i.e., a value that is relatively close to zero, then the center-of-gravity desired velocity determiner 32 sets the desired center-of-gravity velocity additive amount in the X-axis direction Vb_cmd_by_ofs_x to zero.

Further, if the magnitude of the center-of-gravity offset influence amount in the X-axis direction Vofs_x is a value that deviates from the dead zone, then the center-of-gravity desired velocity determiner 32 determines the desired center-of-gravity velocity additive amount in the X-axis direction Vb_cmd_by_ofs_x such that the polarity thereof is the same as Vofs_x and the magnitude thereof increases as the magnitude of Vofs_x increases. However, the value of the desired center-of-gravity velocity additive amount Vb_cmd_by_ofs_x is restricted to the range from a predetermined upper limit value (>0) to a predetermined lower limit value (≤0).

The processing for determining the desired center-of-gravity velocity additive amount in the Y-axis direction Vb_cmd_by_ofs_y is the same as the processing described above.

Subsequently, the center-of-gravity desired velocity determiner 32 carries out, by a processor 32d shown in FIG. 4, the processing for determining a desired velocity V1_xy obtained by adding each component of the desired center-of-gravity velocity additive amount Vb_cmd_by_ofs_xy to each component of the basic velocity command Vjs_xy determined by the operation command converter 31. More specifically, the center-of-gravity desired velocity determiner 32 determines V1_xy (a set of V1_x and V1_y) by the processing denoted by V1_x=Vjs_x+Vb_cmd_by_ofs_x and V1_y=Vjs_y+Vb_cmd_by_ofs_y.

Further, the center-of-gravity desired velocity determiner 32 carries out the processing by a processor 32e. The processor 32e carries out limiting for determining a restricted center-of-gravity desired velocity Vb_cmd_xy (a set of Vb_cmd_x and Vb_cmd_y) as a desired velocity of the vehicle system total center of gravity obtained by restricting the combination of desired velocities V1_x and V1_y in order to prevent the rotational speed of each of the electric motors 8a and 8b constituting the actuator 8 of the first travel operation unit 3 from deviating from a predetermined permissible range.

In this case, if the set of the desired velocities V1_x and V1_y determined by the processor 32d lies within a predetermined region (e.g., an octagonal region) on a coordinate system, in which the axis of ordinate indicates the value of the desired velocity V1_x and the axis of abscissa indicates the value of the desired velocity V1_y, then the desired velocity V1_xy is determined directly as the restricted center-of-gravity desired velocity Vb_cmd_xy.

Further, if the set of the desired velocities V1_x and V1_y determined by the processor 32d deviates from the predetermined region on the coordinate system, then a set that has been restricted to lie on the boundary of the predetermined region is determined as the restricted center-of-gravity desired velocity Vb_cmd_xy.

The center-of-gravity desired velocity Vb_cmd_xy is determined on the basis of the basic velocity command Vjs_xy and the center-of-gravity offset influence amount Vofs_xy (or the center-of-gravity offset) as described above. This enables the rider to maneuver the vehicle 1 by operating the operation device, i.e., by operating the joystick 12, and by changing the posture of his/her body, i.e., by shifting his/her weight.

After carrying out the processing by the center-of-gravity desired velocity determiner 32, the first control processor 24 carries out the processing by the posture control arithmetic unit 34. The posture control arithmetic unit 34 carries out the processing illustrated by the block diagram of FIG. 4 to determine a first desired velocity Vw1_cmd_xy, which is the desired value of the traveling velocity (translational velocity) of the first travel operation unit 3.

More specifically, the posture control arithmetic unit 34 first carries out, by the arithmetic unit 34b, the processing for subtracting each component of the center-of-gravity offset influence amount Vofs_xy from each component of the restricted center-of-gravity desired velocity Vb_cmd_xy, thereby determining a desired velocity with a compensated center-of-gravity offset Vb_cmpn_cmd_xy (a latest value).

Subsequently, according to expressions (4a) and (4b) given below, the posture control arithmetic unit 34 calculates a desired translational acceleration in the X-axis direction DVw1_cmd_x and a desired translational acceleration in the Y-axis direction DVw1_cmd_y of a desired translational acceleration DVw1_cmd_xy, which is the desired value of the translational acceleration at the ground contact point of the first travel operation unit 3, by carrying out the processing through the arithmetic units except for the arithmetic unit 34b and an integral arithmetic unit 34a, which carries out integral operations.

$$DVw1\_cmd\_x = Kvb\_x \cdot (Vb\_cmpn\_cmd\_x - Vb\_estm1\_x) - Kth\_x \cdot \theta b\_act\_x - Kw\_x \cdot \omega b\_act\_x \quad (4a)$$

$$DVw1\_cmd\_y = Kvb\_y \cdot (Vb\_cmpn\_cmd\_y - Vb\_estm1\_y) - Kth\_y \cdot \theta b\_act\_y - Kw\_y \cdot \omega b\_act\_y \quad (4b)$$

In expressions (4a) and (4b), Kvb_xy, Kth_xy and Kw_xy denote predetermined gain values set beforehand.

The first term of the right side of expression (4a) denotes a feedback manipulated variable component based on the difference between the compensated center-of-gravity-offset desired velocity in the X-axis direction Vb_cmpn_cmd_x (a latest value) of the vehicle system total center of gravity and a first estimated value Vb_estm1_x (a latest value), the second term thereof denotes a feedback manipulated variable component based on a measurement value (a latest value) of an actual tilt angle in the direction about the Y-axis θb_act_x of the rider mounting section 5, and the third term thereof denotes a feedback manipulated variable component based on a measurement value (a latest value) of an actual tilt angular velocity in the direction about the Y-axis ωb_act_x of the rider mounting section 5. Further, a desired translational acceleration in the X-axis direction DVw1_cmd_x is calculated as a resultant manipulated variable of the above feedback manipulated variable components.

Similarly, the first term of the right side of expression (4b) denotes a feedback manipulated variable component based on the difference between the compensated center-of-gravity-offset desired velocity in the Y-axis direction Vb_cmpn_cmd_y (a latest value) of the vehicle system total center of gravity and a first estimated value Vb_estm1_y (a latest value), the second term thereof denotes a feedback manipulated variable component based on a measurement value (a latest value) of an actual tilt angle in the direction about the X-axis θb_act_y of the rider mounting section 5, and the third term thereof denotes a feedback manipulated variable component based on a measurement value (a latest value) of an actual tilt angular velocity in the direction about the X-axis ωb_act_y of the rider mounting section 5. Further, a desired translational acceleration in the Y-axis direction DVw1_cmd_y is calculated as a resultant manipulated variable of the above feedback manipulated variable components.

Subsequently, the posture control arithmetic unit 34 integrates the components of the desired translational acceleration DVw1_cmd_xy by the integral arithmetic unit 34a, thereby determining a first desired velocity Vw1_cmd_xy (a latest value) of the first travel operation unit 3.

Then, the first control processor 24 controls the electric motors 8a and 8b constituting the actuator 8 of the first travel operation unit 3 according to the first desired velocity Vw1_cmd_xy determined as described above. More specifically, the first control processor 24 determines the current command values for the electric motors 8a and 8b by feedback control processing so as to make the actual rotational velocities (measurement values) of the electric motors 8a and 8b follow the desired values of the rotational velocities thereof specified by the first desired velocity Vw1_cmd_xy. The first control processor 24 then energizes the electric motors 8a and 8b according to the current command values.

In a state wherein the restricted center-of-gravity desired velocity Vb_cmd_xy remains at a fixed value and the motion of the vehicle 1 has been stabilized after the aforesaid processing, i.e., in a state wherein the vehicle 1 is traveling in a straight line at a fixed velocity, the vehicle system total center of gravity lies right above the ground contact point of the first travel operation unit 3. In this state, the actual tilt angle θb_act_xy of the rider mounting section 5 will be −Ofst_xy/(h−r_xy) according to expressions (1b) and (2b). The actual tilt angular velocity ωb_act_xy of the rider mounting section 5 will be zero and the desired translational acceleration DVw1_cmd_xy will be zero. This combined with the block diagram of FIG. 4 lead to the finding of the agreement between Vb_estm1_xy and Vb_cmd_xy.

In other words, the first desired velocity Vw1_cmd_xy of the first travel operation unit 3 is basically determined to converge the difference between the restricted center-of-gravity desired velocity Vb_cmd_xy of the vehicle system total center of gravity and the first estimated value Vb_estm1_xy to zero.

Further, the rotational speeds of the electric motors 8a and 8b constituting the actuator 8 of the first travel operation unit 3 are controlled so as not to deviate from a predetermined permissible range by the processing carried out by the processor 32e while compensating for the influence on the deviation of the position of the vehicle system total center of gravity from the position of the reference portion Ps_xy in the inverted pendulum model.

This completes the detailed description of the processing by the first control processor 24 in the present embodiment.

The processing by the second control processor 25 will now be described with reference to FIG. 9. To summarize the processing by the second control processor 25, in a situation wherein the basic turn angular velocity ωjs determined by the operation command converter 31 is zero (in a situation wherein the swing amount in the Y-axis direction Js_y of the joystick 12 is zero or substantially zero), a second desired velocity Vw2_cmd_y, which is the desired value of the traveling velocity (translational velocity) in the Y-axis direction of the second travel operation unit 4, is determined to coincide with a first desired velocity in the Y-axis direction Vw1_cmd_y of the first travel operation unit 3 in order to cause the vehicle 1 to perform a translational travel.

Further, in a situation wherein the basic turn angular velocity ωjs is not zero, the second control processor 25 determines the second desired velocity in the Y-axis direction Vw2_cmd_y of the second travel operation unit 4 to be different from the first desired velocity in the Y-axis direction Vw1_cmd_y of the first travel operation unit 3 in order to cause the vehicle 1 to turn.

Specifically, the processing by the second control processor 25 described above is carried out as follows. Referring to FIG. 9, the second control processor 25 first carries out the processing by an arithmetic unit 42. The arithmetic unit 42 multiplies the basic turn angular velocity command ωjs by a value that is (−1) times a distance L (a predetermined value) in the X-axis direction between the first travel operation unit 3 and the second travel operation unit 4. Thus, the second control processor 25 determines a basic relative velocity command Vjs2_y, which is the command value of a relative velocity in the Y-axis direction of the second travel operation unit 4 with respect to the first travel operation unit 3 in order to cause the vehicle 1 to turn at the angular velocity of the basic turn angular velocity command ωjs.

Subsequently, the second control processor 25 carries out, through an arithmetic unit 43, the processing for adding the basic relative velocity command Vjs2_y (a latest value) to the first desired velocity in the Y-axis direction Vw1_cmd_y (a latest value) of the first travel operation unit 3 determined by the first control processor 24, thereby determining the second desired velocity in the Y-axis direction Vw2_cmd_y of the second travel operation unit 4.

Figure 9:
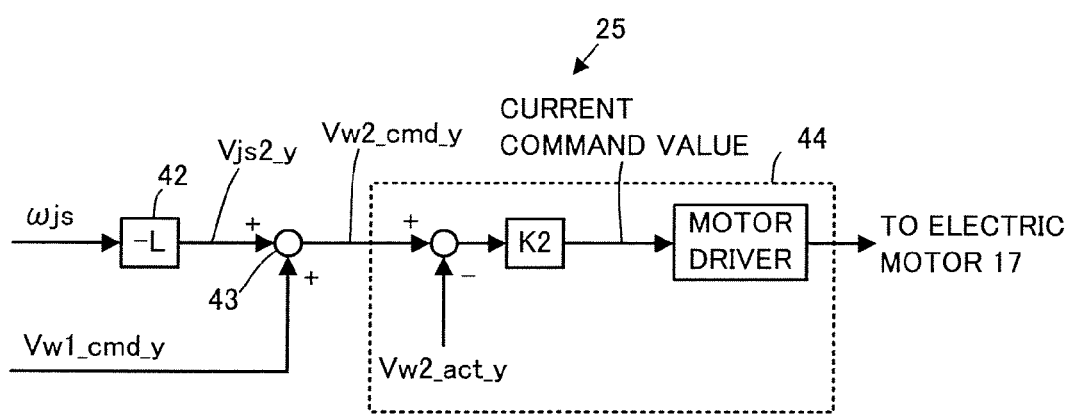
FIG. 9 is a block diagram illustrating the processing by a second control processor shown in FIG. 3.

Then, the second control processor 25 controls the current of the electric motor 17 serving as the second actuator (consequently the driving force of the second travel operation unit 4) such that the current actual traveling velocity in the Y-axis direction Vw2_act_y of the second travel operation unit 4 follows the second desired velocity Vw2_cmd_y (a latest value), as illustrated in an arithmetic unit 44 of FIG. 9.

To be specific, the second control processor 25 determines a current command value Iw2_cmd of the electric motor 17 by carrying out the calculation of expression (5) given below. The second control processor 25 further controls the actual current of the electric motor 17 to Iw2_cmd by a motor driver.

$$Iw2\_cmd = K2 \cdot (Vw2\_cmd\_y - Vw2\_act\_y) \tag{5}$$

In expression (5), K2 denotes a predetermined gain value set beforehand.

According to the present embodiment, a value estimated from a detection value of the rotational speed of the electric motor 17 (a detection value obtained by a rotational speed sensor, such as a rotary encoder, which is not shown) is used as the value of Vw2_act_y.

The difference between a desired value of the rotational speed of the electric motor 17 specified by Vw2_cmd_y and the detection value of the rotational speed may be used in place of Vw2_cmd_y−Vw2_act_y of expression (5).

In the situation wherein the turn command is not being output from the joystick 12 (the situation in which the basic turn angular velocity command ωjs is zero), the second desired velocity Vw2_cmd_y is determined such that it agrees with the first desired velocity in the Y-axis direction Vw1_cmd_y (a latest value) of the first travel operation unit 3 by the control processing carried out by the second control processor 25 described above.

Further, in the situation wherein the turn command is being output from the joystick 12 (in the situation wherein the basic turn angular velocity command ωjs is not zero), the second desired velocity Vw2_cmd_y is determined to be a value obtained by adding the basic relative velocity command Vjs2_y (a latest value) determined on the basis of the basic turn angular velocity command ωjs to the first desired velocity Vw1_cmd_y in the Y-axis direction (a latest value) of the first travel operation unit 3. In other words, the second desired velocity Vw2_cmd_y is determined to agree with Vw1_cmd_y+Vjs2_y.

Therefore, the second desired velocity Vw2_cmd_y is determined to take a velocity value that is different from the first desired velocity in the Y-axis direction Vw1_cmd_y of the first travel operation unit 3 such that the vehicle 1 turns.

More specifically, if the turn command from the joystick 12 is a command for turning the vehicle 1 to the right side (in the right-hand turning), i.e., if ωjs is an angular velocity in the clockwise direction, then the basic relative velocity command Vjs2_y will be a leftward velocity.

At this time, if the first desired velocity in the Y-axis direction Vw1_cmd_y of the first travel operation unit 3 is the leftward velocity, then the second desired velocity in the Y-axis direction Vw2_cmd_y of the second travel operation unit 4 will be a leftward velocity having a magnitude that is larger than that of Vw1_cmd_y.

In the case where the turn command from the joystick 12 is a command for turning the vehicle 1 to the right (the right-hand direction), if the first desired velocity in the Y-axis direction Vw1_cmd_y of the first travel operation unit 3 is a rightward velocity, then the second desired velocity in the Y-axis direction Vw2_cmd_y of the second travel operation unit 4 will be a rightward velocity having a magnitude that is smaller than that of Vw1_cmd_y or a velocity in the opposite direction from that of Vw1_cmd_y, i.e., the leftward direction.

Meanwhile, if the turn command from the joystick 12 is a command for turning the vehicle 1 to the left (left-hand direction), i.e., if ωjs is an angular velocity in the counterclockwise direction, then the basic relative velocity command Vjs2_y will be a rightward velocity.

At this time, if the first desired velocity in the Y-axis direction Vw1_cmd_y of the first travel operation unit 3 is the rightward velocity, then the second desired velocity in the Y-axis direction Vw2_cmd_y of the second travel operation unit 4 will be a rightward velocity having a magnitude that is larger than that of Vw1_cmd_y.

In the case where the turn command from the joystick 12 is a command for turning the vehicle 1 to the left (the left-hand direction), if the first desired velocity in the Y-axis direction Vw1_cmd_y of the first travel operation unit 3 is a leftward velocity, then the second desired velocity in the Y-axis direction Vw2_cmd_y of the second travel operation unit 4 will be a leftward velocity having a magnitude that is smaller than that of Vw1_cmd_y or a velocity in the opposite direction from that of Vw1_cmd_y, i.e., the rightward direction.

This completes the detailed description of the processing carried out by the second control processor 25.

The vehicle 1 according to the present embodiment described above enables the translational travel of the vehicle 1 in the X-axis direction to be accomplished in response to a longitudinal tilt (in the X-axis direction) of the rider mounting section 5 (or the base body 2) caused by the movement of the body of the rider on the rider mounting section 5 or in response to the operation of swinging the joystick 12 in the longitudinal direction.

The translational travel of the vehicle 1 in the Y-axis direction can be also accomplished in response to a lateral tilt (in the Y-axis direction) of the rider mounting section 5 (or the base body 2).

Further, combining the aforesaid translational travels enables the vehicle 1 to translationally travel in an arbitrary direction at an angle relative to the X-axis direction and the Y-axis direction.

A turn (the change of direction) of the vehicle 1 can be also made to the right or left side of the vehicle 1 specified by a turn command by setting the traveling velocities in the Y-axis direction of the first travel operation unit 3 and the second travel operation unit 4 to different values according to a turn command output in response to the operation of swinging the joystick 12 in the lateral direction.

Thus, the translational travel and the turn of the vehicle 1 can be easily made without the need for a complicated operation of an operation device, such as the joystick 12, or a complicated motion of the body of a rider.

When the vehicle 1 is stationary or in other situations wherein the traveling velocity in the Y-axis direction of the first travel operation unit 3 is zero or substantially zero (i.e., when the first desired velocity $Vw1\_cmd\_y$ is zero or substantially zero), if the rider swings the joystick 12 in the lateral direction to turn the vehicle 1, then the basic velocity command $Vjs\_y$, which is the velocity component in the Y-axis direction based on the swing amount of the joystick 12 in the lateral direction, will be added to a desired velocity applied in the case where it is assumed that there has been no operation of swinging the joystick 12 in the lateral direction, thus providing the desired velocity $Vb\_cmd\_xy$ of the vehicle system total center of gravity, which is the representative point of the vehicle 1.

If the turn command from the joystick 12 is the command for turning the vehicle 1 to the left (the left-hand direction), then the velocity component $Vjs\_y$ will be a rightward velocity. If the turn command from the joystick 12 is the command for turning the vehicle 1 to the right (the right-hand direction), then the velocity component $Vjs\_y$ will be a leftward velocity.

Basically, therefore, the first desired velocity in the Y-axis direction $Vw1\_cmd\_y$ of the first travel operation unit 3 and the second desired velocity in the Y-axis direction $Vw2\_cmd\_y$ of the second travel operation unit 4 are set such that they are velocities in the same direction, while the magnitude of $Vw2\_cmd\_y$ is greater than that of $Vw1\_cmd\_y$.

Thus, the turn (the change of direction) of the vehicle 1 in response to the operation of swinging the joystick 12 in the lateral direction is made such that the vehicle 1 rotates in the direction about the yaw axis at each instant during the turn, using an instantaneous turn center in a front region of the ground contact surface of each of the first travel operation unit 3 and the second travel operation unit 4 as the rotational center.

As a result, the rider on the rider mounting section 5 easily senses the turning behavior of the vehicle 1. This enables the rider of the vehicle 1 to operate the joystick 12 to obtain a desired turning behavior by properly recognizing the turning behavior of the vehicle 1.

Further, if, for example, the turn command is output from the joystick 12 in the situation wherein the first desired velocity $Vw1\_cmd\_xy$ of the first travel operation unit 3 has been set to zero or substantially zero, then a velocity command for turning ($\neq 0$) is set as the basic velocity command in the Y-axis direction $Vjs\_y$ related to the first travel operation unit 3. This enables the vehicle 1 to turn by moving the first travel operation unit 3 in the Y-axis direction.

Thus, the frictional force between the first travel operation unit 3 and the floor surface is reduced, permitting a smooth turn of the vehicle 1.

Further, in the present embodiment, the center-of-gravity offset estimator 35a of the first control processor 24 estimates the center-of-gravity offset amount $Ofst\_xy$ of the vehicle system total center of gravity by the processing illustrated in FIG. 8. Hence, the center-of-gravity offset amount can be accurately estimated. Then, based on the estimated value $Ofst\_estm\_xy$ of the center-of-gravity offset amount $Ofst\_xy$, the desired velocity of the vehicle system total center of gravity (the restricted center-of-gravity desired velocity) $Vb\_cmd\_xy$ is determined as described above. This allows the center-of-gravity offset amount $Ofst\_xy$ to properly compensate for the influence exerted on the behavior of the vehicle 1.

Further, in the vehicle 1 according to the present embodiment, the swing amount (the swing amount in the direction about the Y-axis) of the second travel operation unit 4 relative to the base body 2 is mechanically restricted to the predetermined range defined by the stoppers 16 and 16, thereby making it possible to prevent, in particular, the rider mounting section 5, from excessively leaning to the rear, which would cause the rider the inconvenience of poor visibility.

[Second Embodiment]

A second embodiment of the present invention will now be described with reference to FIG. 10. The present embodiment differs from the first embodiment only in a part of the processing carried out by a first control processor 24. Hence, the description of the present embodiment will be mainly focused on the aspects that are different from the first embodiment and the same aspects as those of the first embodiment will not be described.

The present embodiment differs from the first embodiment in a part of the processing (specifically, the processing for determining a basic velocity command in a Y-axis direction $Vjs\_y$) carried out by an operation command converter 31, which determines a basic velocity command $Vjs\_xy$ of a first travel operation unit 3.

In the first embodiment described above, when the vehicle 1 is turned by operating the joystick 12 in the lateral direction, the operation command converter 31 of the first control processor 24 determines the basic velocity command in the Y-axis direction $Vjs\_y$ of the first travel operation unit 3 such that the distance in the X-axis direction between the instantaneous turn center at the time of a turn of the vehicle 1 and the ground contact point of the first travel operation unit 3 takes a predetermined value (a fixed value).

In contrast thereto, according to the present embodiment, an operation command converter 31 determines a basic velocity command in the Y-axis direction $Vjs\_y$ of a first travel operation unit 3 such that the distance in the X-axis direction between the ground contact point of the first travel operation unit 3 and the instantaneous turn center changes according to the moving velocity of a representative point of the vehicle 1 in the X-axis direction, e.g., an estimated value $Vb\_estm1\_x$ of the moving velocity of an vehicle system total center of gravity in the X-axis direction.

Figure 10:
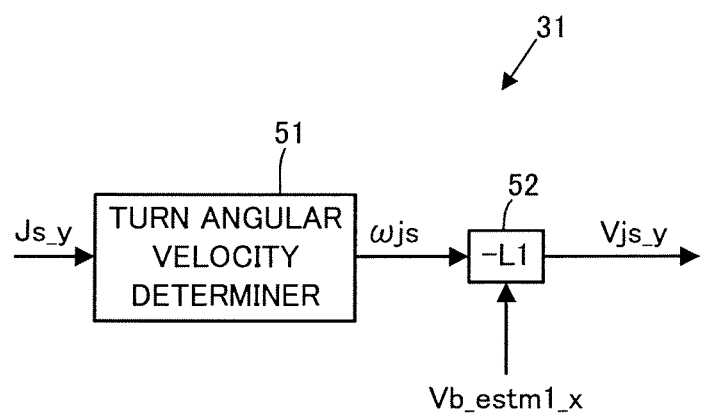
FIG. 10 is a block diagram illustrating the processing by an essential section of a first control processor in a second embodiment of the present invention.

FIG. 10 is a block diagram that illustrates the processing. An operation command converter 31 first carries out the processing by a turn angular velocity determiner 51 to determine a basic turn angular velocity command ωjs on the basis of a swing amount Js_y in a lateral direction of a joystick 12. This processing is the same processing carried out by the processor 31b in FIG. 7 of the first embodiment.

The operation command converter 31 then carries out the processing by an arithmetic unit 52. The arithmetic unit 52 sets a distance L1 in the X-axis direction between an instantaneous turn center and the ground contact point of the first travel operation unit 3 on the basis of an estimated value of the velocity in the X-axis direction Vb_estm1_x of the vehicle system total center of gravity determined by a first control processor 24.

In this case, the arithmetic unit 52 sets L1 according to a preset map or an arithmetic expression such that L1 approaches zero as the magnitude of Vb_estm1_x increases. In other words, the arithmetic unit 42 sets L1 such that L1 decreases as the magnitude of Vb_estm1_x increases.

L1 may be determined by a desired velocity of the vehicle system total center of gravity in the X-axis direction (a restricted center-of-gravity desired velocity) Vb_cmd_x in place of Vb_estm1_x. Alternatively, L1 may be determined on the basis of an estimated value of a moving velocity of a representative point in the X-axis direction at an arbitrary position that has been fixed relative to a base body 2 or a rider mounting section 5. Further alternatively, L1 may be determined on the basis of a first desired velocity in the X-axis direction Vw1_cmd_x of the first travel operation unit 3 or a detection value thereof (the traveling velocity of the first travel operation unit 3 in the X-axis direction calculated from a detection value of the rotational speed of an electric motor 8a).

Then, the arithmetic unit 52 multiplies a value that is (−1) times the distance L1 set as described above (=−L1) by the basic turn angular velocity command ωjs thereby to determine a basic velocity command in the Y-axis direction Vjs_y of the first travel operation unit 3 to cause the vehicle 1 to turn at an angular velocity of the basic turn angular velocity command ωjs in a state wherein the instantaneous turn center lies in a position at the distance L1 on the front side from the ground contact point of the first travel operation unit 3.

The present embodiment is the same as the first embodiment expect for the aspects described above.

The present embodiment provides the following advantages in addition to the same advantages as those of the first embodiment described above. The distance L1 in the X-axis direction between the instantaneous turn center and the ground contact point of the first travel operation unit 3 is determined such that it approaches to zero as the magnitude of the estimated value of the vehicle system total center of gravity in the X-axis direction Vb_estm1_x, which is the moving velocity of the representative point of the vehicle 1 in the X-axis direction, increases.

In this case, if the basic turn angular velocity command ωjs remains constant, then the magnitude of the basic velocity command of the first travel operation unit 3 in the Y-axis direction Vjs_y approaches to zero as L1 approaches to zero. Basically, therefore, the desired traveling velocity of the first travel operation unit 4 in the Y-axis direction Vw1_cmd_y and the desired traveling velocity of the second travel operation unit 4 in the Y-axis direction Vw2_cmd_y are determined such that the magnitude of the ratio of Vw1_cmd_y with respect to Vw2_cmd_y approaches zero.

In this case, the turn of the vehicle 1 will be made such that the travel distances of the first travel operation unit 3 and the second travel operation unit 4 in the Y-axis direction decrease. This enables the rider to operate the joystick 12 so as to make a turn of the vehicle 1 substantially along a desired path. Thus, the maneuverability for turning the vehicle 1 at a relatively high speed can be improved.

Further, the distance L1 increases in a situation wherein the traveling velocity of the vehicle 1 (the moving velocity of the vehicle system total center of gravity in the X-axis direction) is relatively low, so that the turn of the vehicle 1 is made by moving the first travel operation unit 3 and the second travel operation unit 4 in the Y-axis direction. This makes it possible to prevent the turn of the vehicle 1 from being interfered with by a frictional force between the first travel operation unit 3 and a floor surface.

Several modified forms of the aforesaid embodiments will now be described.

In the embodiments described above, the joystick 12 has been used as the operation device for outputting turn commands and the like; however, a trackball or a touch-pad may be used in place of a joystick. Alternatively, a load sensor adapted to detect a place that comes in contact with a rider or a posture sensor held by a rider may be used instead of the joystick 12. Further alternatively, a portable terminal, such as a smartphone, may be used as the operation device.

Further, the second travel operation unit 4 in the aforesaid embodiments has been the omniwheel formed of a pair of annular core members and a plurality of rollers 13 externally inserted therein. Alternatively, however, the second travel operation unit 4 may be constituted of a single annular core member and a plurality of rollers externally inserted therein. The second travel operation unit 4 may alternatively have, for example, the same construction as that of the first travel operation unit 3, instead of using the omniwheel.

Further, the second desired velocity of the second travel operation unit 4 in the Y-axis direction Vw2_cmd_y at the time of a turn may be changed as necessary on the basis of the estimated value in the Y-axis direction Ofst_estm_y of the center-of-gravity offset amount Ofst_xy (or the velocity component determined on the basis of Ofst_estm_y may be added to the basic desired velocity Vw2_cmd_y). This arrangement permits further improved maneuverability of the vehicle 1 at the time of turning.

In the first embodiment described above, the first desired velocity of the first travel operation unit 3 in the Y-axis direction Vw1_cmd_y at the time of turning may be limited to a lower velocity in the case where the magnitude of the first desired velocity in the X-axis direction Vw1_cmd_x is relatively large. This arrangement makes it possible to enhance the maneuverability of the vehicle 1 at the time of turning.

Further, instead of using a detection signal of the yaw rate sensor 23 as the measurement value of the actual yaw rate ωz_act of the vehicle 1, the actual yaw rate ωz_act may be determined by dividing the difference between the actual velocity (or the desired velocity) of the first travel operation unit 3 in the Y-axis direction and the actual velocity (or the desired velocity) of the second travel operation unit 4 in the Y-axis direction by the distance L in the X-axis direction between the first travel operation unit 3 and the second travel operation unit 4.

What is claimed is:

1. An inverted pendulum type vehicle at least comprising: a first travel operation unit capable of traveling on a floor surface; a first actuator that drives the first travel operation unit; a base body to which the first travel operation unit and the first actuator are installed; and a rider mounting section attached to the base body such that the rider mounting section is tiltable relative to a vertical direction, wherein the first travel operation unit is configured to be capable of traveling in all directions, including a longitudinal direction and a lateral direction relative to the rider mounting section, by a driving force of the first actuator, the inverted pendulum type vehicle further comprising:

a second travel operation unit, which is connected to the first travel operation unit or the base body at an interval from the first travel operation unit in the longitudinal direction and which is configured to be capable of traveling in all directions on a floor surface;

a second actuator which generates a driving force for causing at least the second travel operation unit to travel in the lateral direction;

an operation device which outputs a turn command for causing at least the inverted pendulum type vehicle to turn in response to an operation performed by the rider on the rider mounting section;

a first control unit which controls a traveling motion of the first travel operation unit by controlling the first actuator; and a second control unit which controls a traveling motion of the second travel operation unit by controlling the second actuator, wherein the first control unit controls the first actuator to cause the first travel operation unit to travel on the basis of at least the tilting of the rider mounting section in one or both of the longitudinal direction and the lateral direction in both a case where the turn command has been output from the operation device and a case where the turn command has not been output therefrom, the second control unit controls the second actuator such that the moving velocity of a ground contact point of the second travel operation unit in the lateral direction is different from the moving velocity of a ground contact point of the first travel operation unit in the lateral direction in a case where the turn command is issued from the operation device in a situation in which at least the first travel operation unit is traveling in the longitudinal direction or at rest, the second travel operation unit is disposed at the rear of the first travel operation unit, and the second control unit controls the second actuator such that a relative traveling velocity of the ground contact point of the second travel operation unit in the lateral direction with respect to the ground contact point of the first travel operation unit becomes a leftward relative velocity in the case where the turn command for turning the inverted pendulum type vehicle to the right has been output from the operation device, or such that a relative traveling velocity of the ground contact point of the second travel operation unit in the lateral direction with respect to the ground contact point of the first travel operation unit becomes a rightward relative velocity in the case where the turn command for turning the inverted pendulum type vehicle to the left has been output from the operation device.

2. The inverted pendulum type vehicle according to claim 1, wherein the first control unit controls the first actuator to cause the first travel operation unit to travel in the lateral direction in the case where the turn command is output from the operation device in a situation in which at least the moving velocity of the ground contact point of the first travel operation unit in the lateral direction is zero.

3. The inverted pendulum type vehicle according to claim 1, wherein the first control unit controls the first actuator to cause the first travel operation unit to travel leftwards in the case where the turn command for turning the inverted pendulum type vehicle to the right has been output from the operation device in a first situation in which at least the moving velocity of the ground contact point of the first travel operation unit in the longitudinal direction and the lateral direction has reached zero, or controls the first actuator to cause the first travel operation unit to travel rightwards in the case where the turn command for turning the inverted pendulum type vehicle to the left has been output from the operation device in the first situation.

4. The inverted pendulum type vehicle according to claim 3, wherein the first control unit and the second control unit control the first actuator and the second actuator, respectively, such that the moving velocity of the ground contact point of the first travel operation unit in the lateral direction becomes a moving velocity of zero or more in the same direction as that of the moving velocity of the ground contact point of the second travel operation unit and such that the magnitude of the moving velocity of the ground contact point of the second travel operation unit in the lateral direction is larger than the magnitude of the moving velocity of the ground contact point of the first travel operation unit in the case where the turn command has been output from the operation device in a second situation in which at least the first travel operation unit is traveling in the longitudinal direction.

5. The inverted pendulum type vehicle according to claim 4, wherein the first control unit and the second control unit control the first actuator and the second actuator, respectively, so as to bring the ratio of the magnitude of the moving velocity of the ground contact point of the first travel operation unit relative to the magnitude of the moving velocity of the ground contact point of the second travel operation unit in the lateral direction closer to zero as the magnitude of the moving velocity of a preset representative point of the inverted pendulum type vehicle in the longitudinal direction increases in the case where the turn command has been output from the operation device in the second situation.

6. The inverted pendulum type vehicle according to claim 1, wherein the first control unit and the second control unit control the moving velocities of the ground contact points of the first travel operation unit and the second travel operation unit in the lateral direction through the first actuator and the second actuator, respectively, such that the inverted pendulum type vehicle turns and an instantaneous turn center lies in a front region of the first travel operation unit in the case where the turn command has been output from the operation device in the first situation, in which at least the moving velocity of the ground contact point of the first travel operation unit in the longitudinal direction and the lateral direction is zero.

7. The inverted pendulum type vehicle according to claim 6, wherein the first control unit and the second control unit control the moving velocities of the ground contact points of the first travel operation unit and the second travel operation unit in the lateral direction through the first actuator and the second actuator, respectively, such that the inverted pendulum type vehicle turns and the instantaneous turn center lies in the ground contact surface of the first travel operation unit or in a region in front of the ground contact surface in the case where the turn command has been output from the operation device in a second situation, in which at least the first travel operation unit is traveling in the longitudinal direction.

8. The inverted pendulum type vehicle according to claim 7, wherein the first control unit and the second control unit control the moving velocities of the ground contact points of the first travel operation unit and the second travel operation unit in the lateral direction through the first actuator and the second actuator, respectively, so as to bring the instantaneous turn center closer to the ground contact surface of the first travel operation unit from the front side of the ground contact surface as the magnitude of the moving velocity of a preset representative point of the inverted pendulum type vehicle in the longitudinal direction increases in the case where the turn command has been output from the operation device in the second situation.

* * * * *